(12) United States Patent
Yamashina

(10) Patent No.: US 7,821,550 B2
(45) Date of Patent: Oct. 26, 2010

(54) REMOTE IMAGE-PICKUP SYSTEM, CAMERA DEVICE, AND CARD SUBSTRATE

(75) Inventor: Tomokuni Yamashina, Kanagawa (JP)

(73) Assignee: Sony Corporation, Tokyo (JP)

( * ) Notice: Subject to any disclaimer, the term of this patent is extended or adjusted under 35 U.S.C. 154(b) by 901 days.

(21) Appl. No.: 11/032,062

(22) Filed: Jan. 11, 2005

(65) Prior Publication Data
US 2005/0174445 A1    Aug. 11, 2005

(30) Foreign Application Priority Data
Jan. 13, 2004    (JP) ............................ 2004-005749

(51) Int. Cl.
    *H04N 5/76*    (2006.01)
(52) U.S. Cl. .................. 348/231.7; 348/211.1; 348/143
(58) Field of Classification Search ............. 348/231.7, 348/375, 233, 211.1, 231.9, 143; 358/1.15; 375/316, 347
See application file for complete search history.

(56) References Cited

U.S. PATENT DOCUMENTS

| | | | | |
|---|---|---|---|---|
| 5,111,300 A * | 5/1992 | Nam | ............... | 348/231.6 |
| 5,374,962 A * | 12/1994 | Klink | ............... | 348/557 |
| 5,621,428 A * | 4/1997 | King et al. | ............... | 345/641 |
| 5,631,701 A * | 5/1997 | Miyake | ............... | 348/222.1 |
| 5,790,193 A * | 8/1998 | Ohmori | ............... | 348/375 |
| 5,793,420 A * | 8/1998 | Schmidt | ............... | 348/148 |
| 5,883,670 A * | 3/1999 | Sporer et al. | ............... | 375/240.25 |
| 5,903,790 A * | 5/1999 | Morisawa | ............... | 396/429 |
| 6,295,084 B1 * | 9/2001 | Nishizawa et al. | ............... | 348/211.1 |
| 6,414,723 B1 * | 7/2002 | Hwang et al. | ............... | 348/588 |
| 6,483,550 B1 * | 11/2002 | Murata et al. | ............... | 348/572 |
| 6,577,348 B1 * | 6/2003 | Park | ............... | 348/554 |
| 6,601,766 B2 * | 8/2003 | Nakagawa et al. | ............... | 235/451 |
| 6,683,643 B1 * | 1/2004 | Takayama et al. | ............... | 348/247 |
| 6,724,427 B1 * | 4/2004 | Fredlund et al. | ............... | 348/333.07 |
| 6,733,183 B2 * | 5/2004 | Gregory | ............... | 385/53 |
| 6,750,902 B1 * | 6/2004 | Steinberg et al. | ............... | 348/211.3 |
| 7,102,671 B1 * | 9/2006 | Asnaashari | ............... | 348/231.9 |
| 7,116,363 B2 * | 10/2006 | Fuchimukai | ............... | 348/231.8 |
| 7,253,834 B2 * | 8/2007 | Mihara et al. | ............... | 348/208.11 |

(Continued)

FOREIGN PATENT DOCUMENTS

JP    9-238277    9/1997

(Continued)

*Primary Examiner*—John M Villecco
*Assistant Examiner*—Kent Wang
(74) *Attorney, Agent, or Firm*—Oblon, Spivak, McClelland, Maier & Neustadt, L.L.P.

(57) ABSTRACT

A remote image-pickup system includes a camera device including an image-pickup unit for capturing an image of a subject and generating picture signals and a card slot; and a plurality of types of card substrates which are selectively inserted into the card slot and which convert the format of the picture signals so as to output the converted signals to an external device. By inserting different card substrates into the card slot, a plurality of formats of picture signals can be output from the camera device. Accordingly, the format of the picture signals output from the camera device can be flexibly expanded. Further, since many circuits for converting the picture signals need not be incorporated into the camera device, an increase in the size and price of the camera device can be prevented.

37 Claims, 12 Drawing Sheets

U.S. PATENT DOCUMENTS

| | | | |
|---|---|---|---|
| 7,271,930 B2 * | 9/2007 | Ito et al. | 358/1.16 |
| 7,324,167 B2 * | 1/2008 | Miller | 348/723 |
| 7,432,952 B2 * | 10/2008 | Fukuoka, Hiroki | 348/207.1 |
| 7,466,364 B2 * | 12/2008 | Wischermann | 348/607 |
| 2002/0040480 A1 * | 4/2002 | Koike | 725/105 |
| 2002/0149672 A1 | 10/2002 | Clapp et al. | |
| 2003/0071802 A1 * | 4/2003 | Sendelweck et al. | 345/204 |
| 2003/0201322 A1 * | 10/2003 | Wu | 235/441 |
| 2004/0048567 A1 * | 3/2004 | Ohgami et al. | 455/11.1 |
| 2005/0030376 A1 * | 2/2005 | Terada et al. | 348/143 |
| 2006/0114348 A1 * | 6/2006 | Fujii et al. | 348/373 |

FOREIGN PATENT DOCUMENTS

| | | | |
|---|---|---|---|
| JP | 9-238278 | | 9/1997 |
| JP | 10-75390 | | 3/1998 |
| JP | 10-308981 | * | 11/1998 |
| JP | 2004-532569 | | 10/2004 |
| WO | WO 02/085020 A1 | | 10/2002 |

* cited by examiner

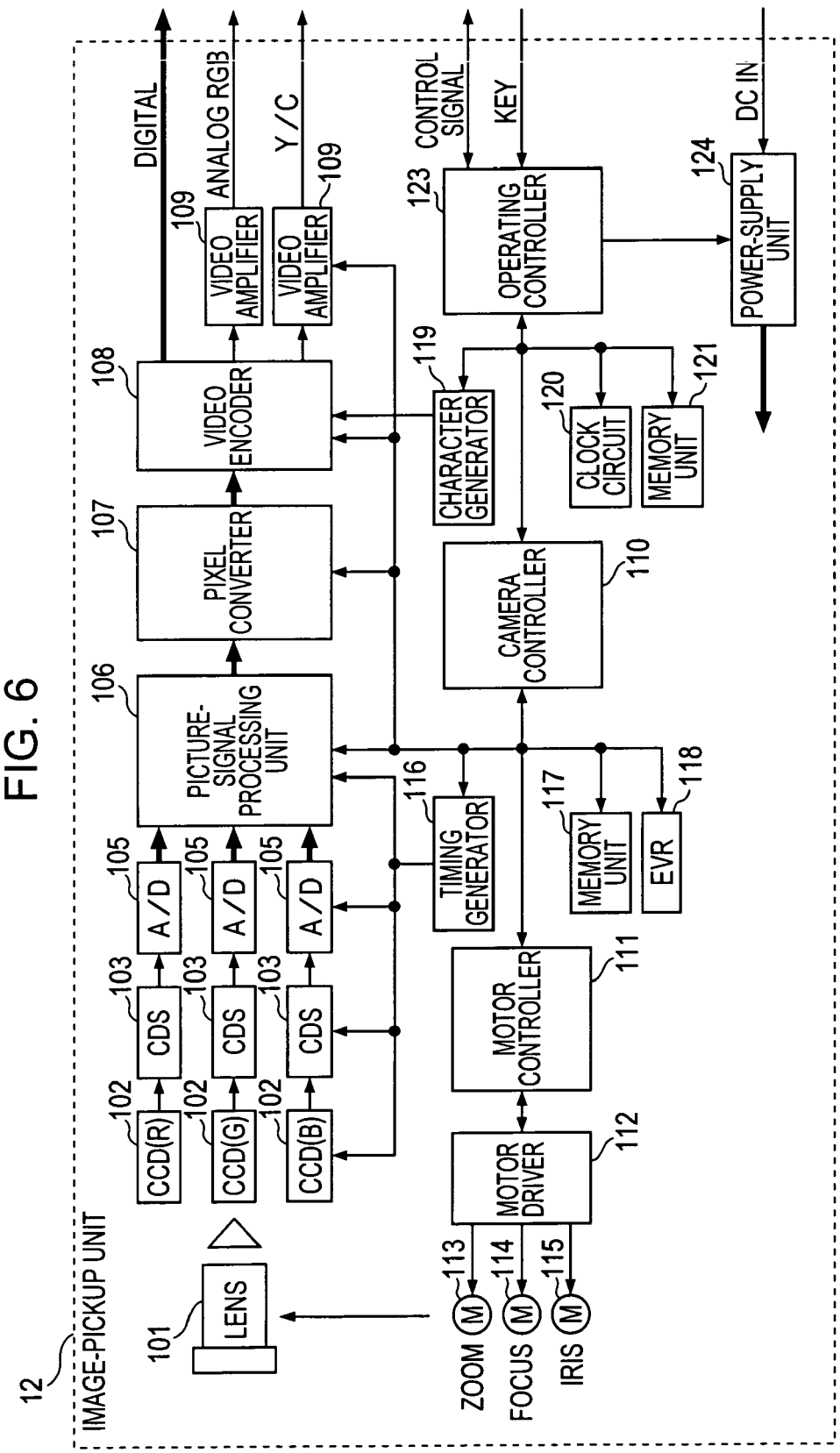

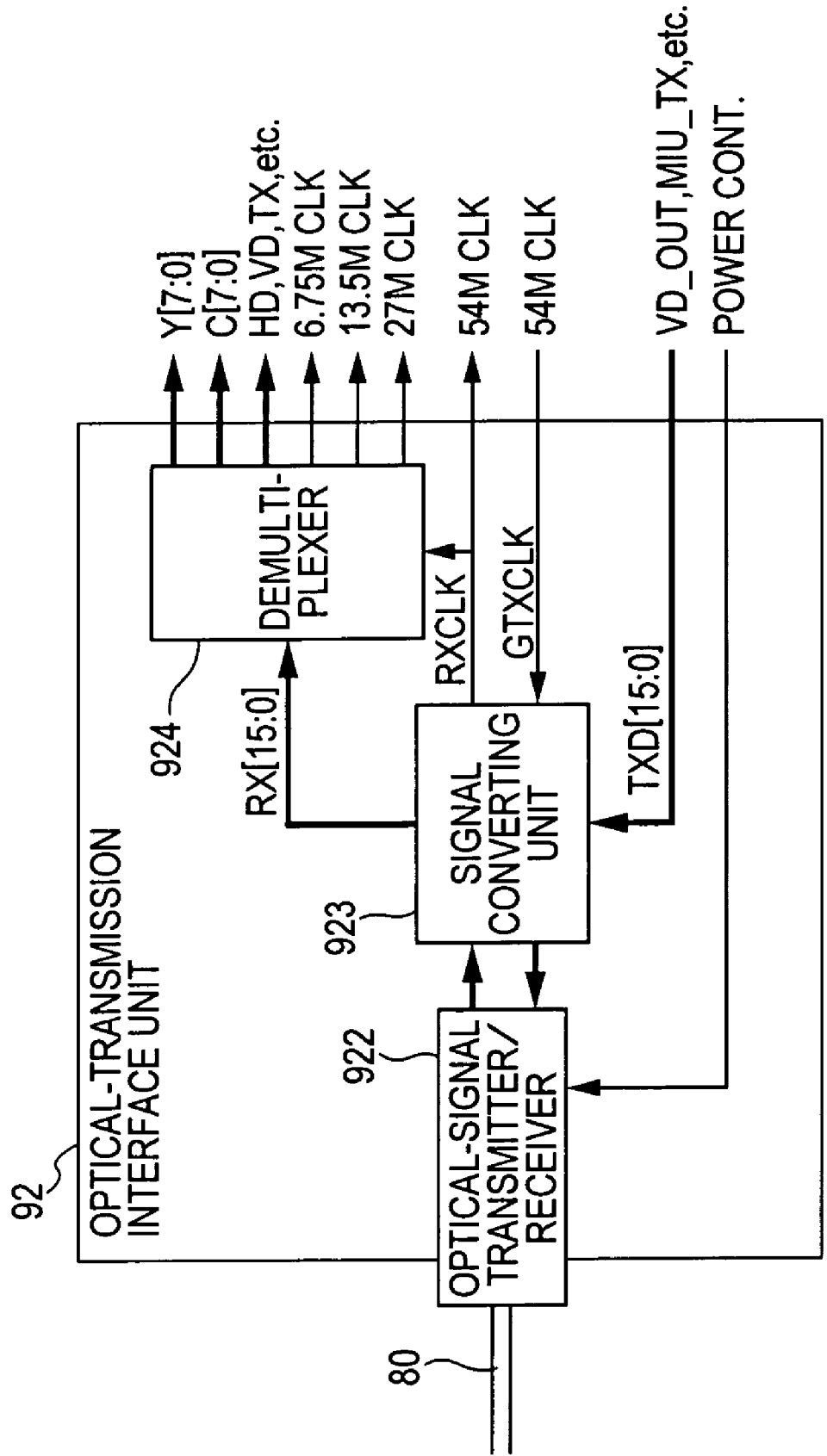

REMOTE IMAGE-PICKUP SYSTEM, CAMERA DEVICE, AND CARD SUBSTRATE

BACKGROUND OF THE INVENTION

1. Field of the Invention

The present invention relates to a remote image-pickup system of capturing an image of a subject at a remote location by using a camera device.

2. Description of the Related Art

Hitherto, a remote image-pickup system including a camera device for capturing an image of a subject at a remote location and a device for displaying/recording the image captured by the camera device has been used. For example, Patent Document 1: Japanese Unexamined Patent Application Publication No. 7-212748 describes a surveillance camera system in which surveillance cameras are provided in a plurality of sites in a construction and an observer observes images captured by these surveillance cameras at one place.

In recent years, remote image-pickup systems have been widely adopted for various applications of monitoring a wedding hall, a conference room a chapel, etc., and for network cameras, in addition to the application as security cameras. With the increasing demand for such remote image-pickup systems, the format of picture signals required by users has diversified. Specifically, a camera device capable of outputting picture signals of various formats according to the application to be used, such as digital picture signals including a serial digital interface (SDI) signal; a digital video (DV) signal; and an Internet protocol (IP)-compatible signal, and a signal which can be transmitted through an optical-fiber cable, as well as the conventional analog picture signals, has been required.

In the known remote image-pickup system, however, the format of picture signals which can be output from the camera device is limited, and thus sufficient expandability of picture signals to be output cannot be realized. Further, in order to allow the camera device to output picture signals of a plurality of types of formats, a plurality of types of picture-signal converting circuits must be provided in the camera device. Accordingly, the size and price of the camera device increase disadvantageously.

SUMMARY OF THE INVENTION

The present invention has been made in view of the foregoing problems, and an object of the present invention is to provide a new and improved remote image-pickup system capable of flexibly expanding the format of picture signals output from a camera device, while preventing an increase in the size and price of the camera device.

In order to solve the above-described problems, according to an aspect of the present invention, a remote image-pickup system including: a camera device which has an image-pickup unit for capturing an image of a subject and generating picture signals and a card slot; and a plurality of types of card substrates which are selectively inserted into the card slot and which convert the format of the picture signals so as to output the converted signals to an external device, is provided.

With this configuration, by inserting different card substrates into the card slot, a plurality of formats of picture signals can be output from the camera device. Accordingly, the format of the picture signals output from the camera device can be flexibly expanded. Further, since many circuits for converting the picture signals need not be incorporated into the camera device, an increase in the size and price of the camera device can be prevented.

The plurality of types of card substrates may comprise at least one selected from the group consisting of: an analog card substrate for converting the format of the picture signals to an analog signal format; a serial digital interface card substrate for converting the format of the picture signals to a serial digital interface signal format; a digital video card substrate for converting the format of the picture signals to a digital video signal format; and a network-transmission card substrate for converting the format of the picture signals to an Internet-protocol signal format.

Also, the plurality of types of card substrates may comprise an optical-transmission card substrate for converting the format of the picture signals to a format capable of being transmitted through an optical-fiber cable and for transmitting the converted signals. Accordingly, the picture signals can be transmitted over a long distance. Further, since the camera device can be connected to a remote external device through one optical-fiber cable, the efficiency of wiring installation can be improved and the price of the entire remote image-pickup system can be reduced.

The remote image-pickup system may further include a relay device which is connected to the optical-transmission card substrate through the optical-fiber cable and which relays the picture signals between the camera device and the external device. With this configuration, picture signals can be transmitted from the camera device to the remote relay device over a long distance, and the picture signals can be output from the relay device.

The optical-transmission card substrate may multiplex the picture signals and transmit the multiplexed picture signal, so that the relay device may receive the multiplexed picture signal from the optical-transmission card substrate and demultiplex the picture signal. Further, the optical-transmission card substrate may multiplex the picture signals and a synchronizing signal and transmit the multiplexed signal.

The relay device may include a card slot to which the plurality of types of card substrates can be selectively inserted. With this configuration, by inserting the card substrates into the relay device, various formats of picture signals can be output from the relay device. Therefore, even when picture signals are transmitted over a long distance, the expandability of the format of the picture signals which can be output can be maintained.

The remote image-pickup system may further include a control device for remotely controlling the camera device. The control device is connected to the relay device, and a camera-operation control signal generated by the control device may be transmitted to the camera device via the relay device, the optical-fiber cable, and the optical-transmission card substrate. Accordingly, the number of wiring lines for connecting the camera device and the external device can be reduced.

The camera-operation control signal may comprise at least one selected from the group consisting of: an image-pickup-condition control signal for controlling the image-pickup condition of the image-pickup unit; a lens control signal for controlling the operation of a lens included in the image-pickup unit; a pan control signal for controlling the drive of the image-pickup unit in pan directions; and a tilt control signal for controlling the drive of the image-pickup unit in tilt directions.

An external synchronizing signal is input to the relay device, and the external synchronizing signal may be transmitted to the camera device via the optical-fiber cable and the optical-transmission card substrate. Accordingly, the number of wiring lines for connecting the camera device and the external device can be reduced.

The camera device may include a card identifying unit for identifying the type of the card substrate inserted into the card slot. With this configuration, the camera device is capable of controlling picture signals and control signals input/output to the card substrate and communication forms according to the type of the inserted card substrate.

The image-pickup unit may include a 3-plate CCD. With this configuration, picture signals of high quality and high resolution can be generated and output.

In the camera device, the image-pickup unit may be integrated with a driving unit which drives the image-pickup unit in pan and/or tilt directions. With this configuration, an integrated compact image-pickup device can be obtained with a low price. Also, the number of wiring lines for connecting the image-pickup device and the external device can be reduced.

A connector unit including a plurality of input/output terminals and the card slot may be disposed in substantially parallel with each other on one side of the camera device. With this arrangement, the height of the camera device can be reduced and the camera device can be miniaturized.

In order to solve the above-described problems, according to another aspect of the present invention, a camera device including: an image-pickup unit for capturing an image of a subject and generating picture signals; and a card slot to which a plurality of types of card substrates for converting the format of the picture signals and outputting the converted signals to an external device can be selectively inserted, is provided.

The plurality of types of card substrates may comprise at least one selected from the group consisting of: an analog card substrate for converting the format of the picture signals to an analog signal format; a serial digital interface card substrate for converting the format of the picture signals to a serial digital interface signal format; a digital video card substrate for converting the format of the picture signals to a digital video signal format; and a network-transmission card substrate for converting the format of the picture signals to an Internet-protocol signal format.

Also, the plurality of types of card substrates may comprise an optical-transmission card substrate for converting the format of the picture signals to a format capable of being transmitted through an optical-fiber cable and for transmitting the converted signals.

When the optical-transmission card substrate is inserted into the card slot, a camera-operation control signal transmitted from a control device which controls the camera device can be received through the optical-fiber cable. Further, the camera-operation control signal may comprise at least one selected from the group consisting of: an image-pickup-condition control signal for controlling the image-pickup condition of the image-pickup unit; a lens control signal for controlling the operation of a lens included in the image-pickup unit; a pan control signal for controlling the drive of the image-pickup unit in pan directions; and a tilt control signal for controlling the drive of the image-pickup unit in tilt directions.

When the optical-transmission card substrate is inserted into the card slot, an external synchronizing signal may be received through the optical-fiber cable.

The camera device may further include a card identifying unit for identifying the type of the card substrate inserted into the card slot.

The image-pickup unit may include a 3-plate CCD. Further, the image-pickup unit may be integrated with a driving unit which drives the image-pickup unit in pan and/or tilt directions.

A connector unit including a plurality of input/output terminals and the card slot may be disposed in substantially parallel with each other on one side of the camera device.

In order to solve the above-described problems, according to another aspect of the present invention, a card substrate which is inserted into a card slot provided in a camera device for capturing an image of a subject and generating picture signals and which converts the format of the picture signals generated by the camera device so as to output the converted signals to an external device, is provided.

The card substrate may be any of an analog card substrate for converting the format of the picture signals to an analog signal format; a serial digital interface card substrate for converting the format of the picture signals to a serial digital interface signal format; a digital video card substrate for converting the format of the picture signals to a digital video signal format; and a network-transmission card substrate for converting the format of the picture signals to an Internet-protocol signal format.

The card substrate may be an optical-transmission card substrate for converting the format of the picture signals to a format capable of being transmitted through an optical-fiber cable and for outputting the converted signals. Further, the optical-transmission card substrate may multiplex the picture signals and transmit the multiplexed picture signal. Still further, the optical-transmission card substrate may multiplex the picture signals and a synchronizing signal and transmit the multiplexed signal.

As described above, according to the present invention, the format of the picture signals which can be output from the camera device can be flexibly expanded while preventing an increase in the size and price of the camera device of the remote image-pickup system.

BRIEF DESCRIPTION OF THE DRAWINGS

FIG. 6 is a block diagram showing the configuration of an image-pickup unit of the camera device according to the embodiment;

FIG. 11 is a block diagram showing the configuration of an optical-transmission interface unit of a relay device according to the embodiment.

DESCRIPTION OF THE PREFERRED EMBODIMENT

Figure 1:
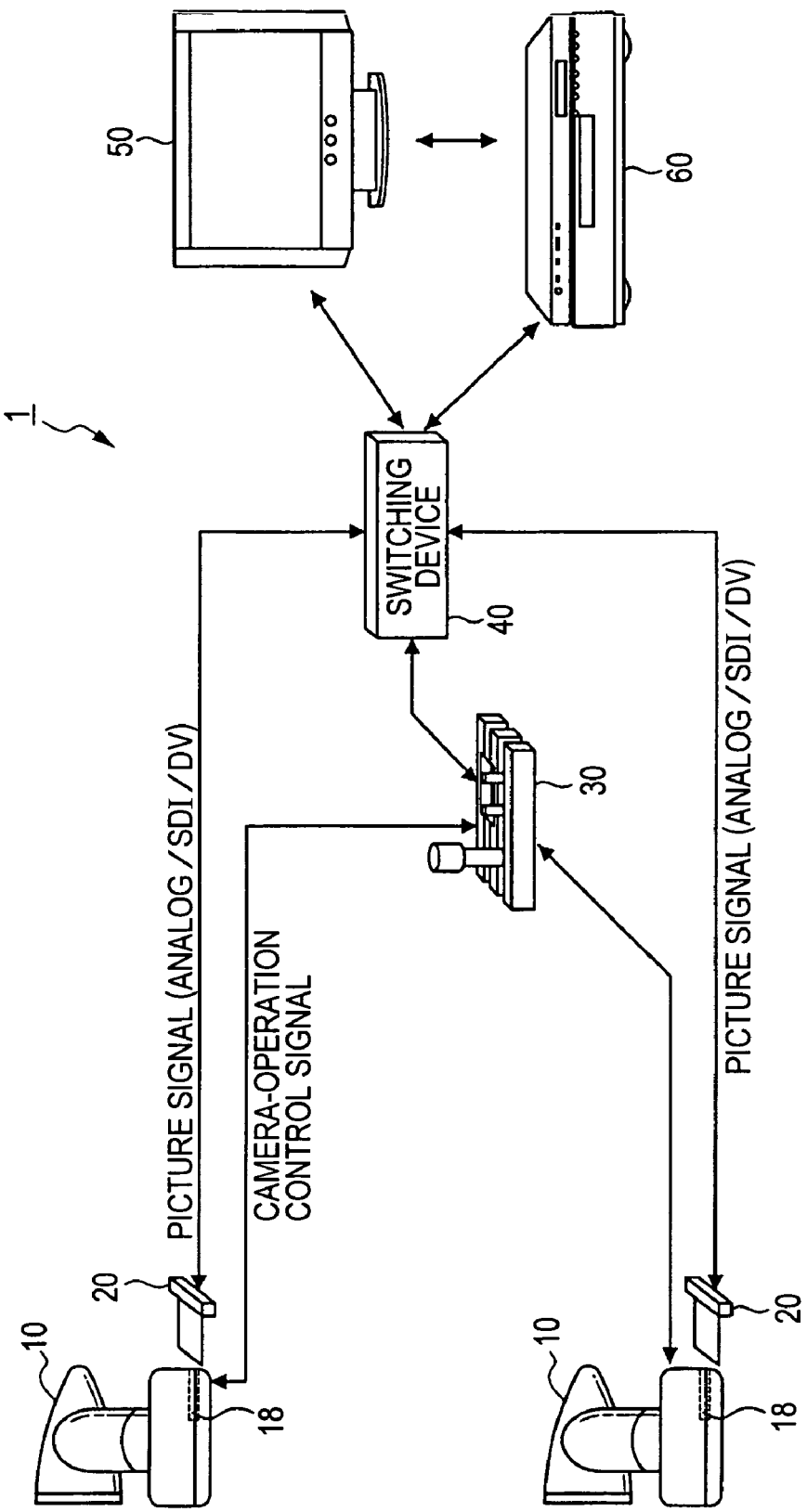
FIG. 1 shows a schematic configuration of a remote image-pickup system according to an embodiment of the present invention in a case where picture signals from a camera device are transmitted over a short distance.

Hereinafter, a preferred embodiment of the present invention will be described with reference to the attached drawings. In the specification and the drawings, elements having substantially the same function and configuration will be denoted by the same reference numerals and overlapped description will be omitted.

Hereinafter, a remote image-pickup system and the elements thereof according to an embodiment of the present invention will be described. The remote image-pickup system according to the embodiment is an image-pickup system for capturing images by a camera device placed in an image-pickup site and monitoring/recording the images at a location away from the camera device. The remote image-pickup system is adopted as, for example, a surveillance camera system for security inside/outside a building, a police station, a train station, or other constructions, or in a street such as a shopping mall; a monitoring system in a wedding hall, a conference room, an office, a hospital, a school, a chapel, etc.; or a system for producing video programs in a one-man broadcast station.

Figure 2:
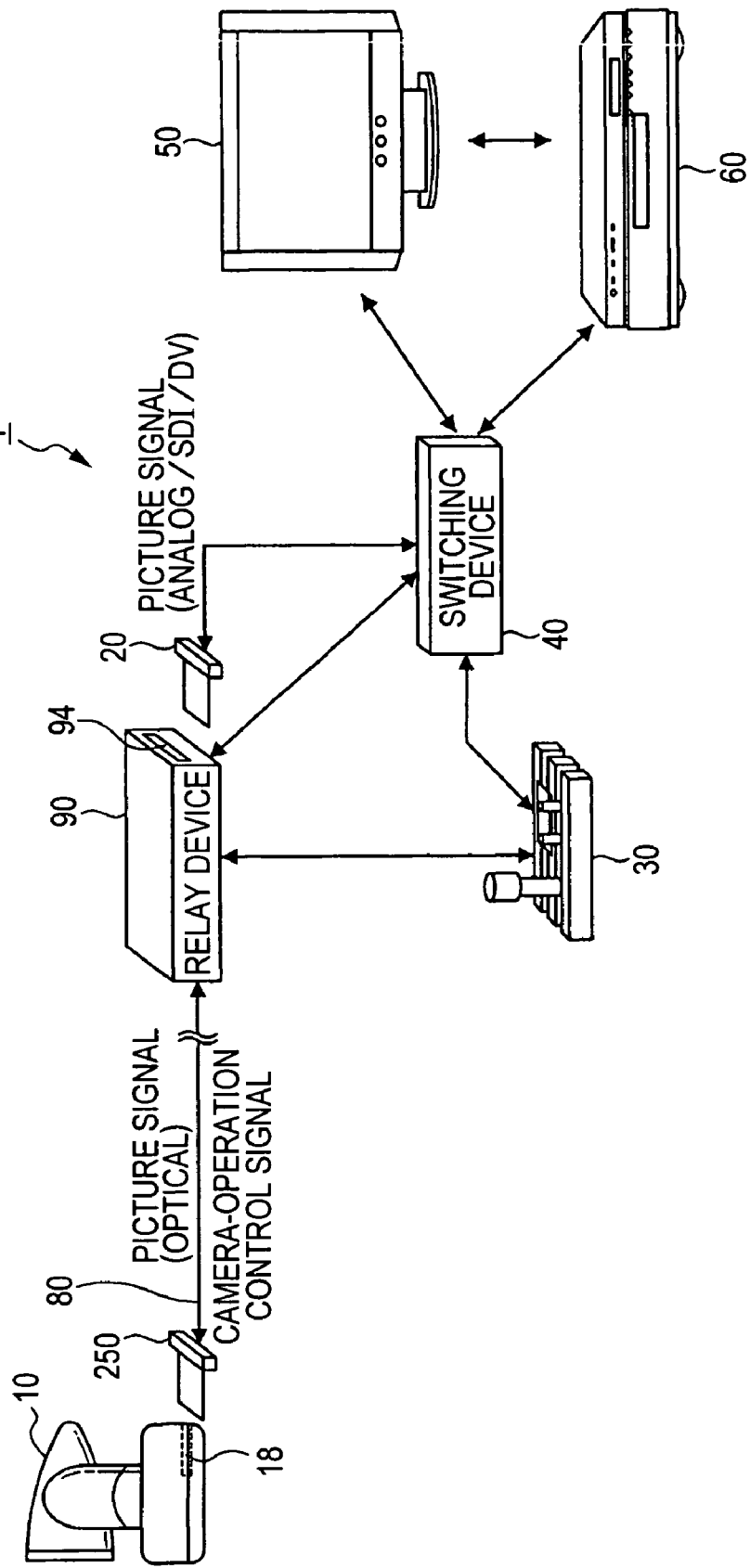
FIG. 2 shows a schematic configuration of the remote image-pickup system according to the embodiment in a case where picture signals from the camera device are transmitted over a long distance.

First, the configuration of a remote image-pickup system 1 according to the embodiment will be described with reference to FIGS. 1 and 2. FIG. 1 shows a schematic configuration of the remote image-pickup system 1 in a case where picture signals from a camera device 10 are transmitted over short distances. FIG. 2 shows a schematic configuration of the remote image-pickup system 1 in a case where picture signals from the camera device 10 are transmitted over long distances.

The remote image-pickup system 1 which has the configuration shown in FIG. 1 is adopted when the distance between the camera device 10 and a control device 30/a monitor device 50 is relatively short (e.g., within several tens of meters). Specifically, this configuration is adopted when the image-pickup site and the site where images are observed/monitored are placed in the same room or on the same floor of a construction, or in a small construction.

As shown in FIG. 1, the remote image-pickup system 1 includes one or more camera devices 10 which are placed in image-pickup sites and which capture images of subjects; a plurality of types of option card substrates 20, each of which can be inserted/removed into/from an option card slot 18 of the camera device 10; the control device 30 for remotely controlling the camera device(s) 10; a switching device 40 for switching picture signals; the monitor device 50 for displaying input picture signals on a screen; and a recording/playback device 60 for recording/playing back picture signals.

Each of the camera devices 10 is, for example, a compact video camera capable of capturing color moving images. The camera device 10 is placed at a site where images of subjects can be captured (e.g., on a wall, ceiling, or floor inside/outside a construction, or on a post in a street) and functions as a surveillance camera or a monitoring camera. In this system, only one camera device 10 may be provided, or a plurality of camera devices 10 (two camera devices are shown in FIG. 1) may be provided in different sites so that images of a plurality of subjects can be captured.

The camera device 10 is an integrated 3CCD camera including a pan/tilt/zoom driving function. That is, in the camera device 10, an image-pickup unit for capturing images of subjects and generating picture signals is integrated with a driving unit for turning the image-pickup unit in pan/tilt directions and adjusting the lens (zoom, focus, iris, etc.). Due to such integration, the entire camera device 10 is miniaturized. Furthermore, by incorporating a 3-plate CCD camera therein, picture signals of high quality and high resolution can be output.

In the camera device 10, electric power is supplied from an external AC adopter (not shown) to a power-supply terminal disposed on the rear surface thereof. Upon power-up of the camera device 10, the pan/tilt driving unit is turned on, and the camera device 10 (angle of the lens) is adjusted in a predetermined image-pickup direction and is then stopped. Also, by connecting a cable to a picture output terminal on the rear surface of the camera device 10, picture signals obtained by image pickup can be output to an external device. Further, a terminal for inputting/outputting a camera-operation control signal and the like from the control device 30 is disposed on the rear surface of the camera device 10. The control device 30 may be directly connected to this terminal.

Furthermore, one option card slot 18 (hereinafter referred to as a "card slot 18"), which is a feature of the embodiment, is provided in the camera device 10. A plurality of types of the option card substrates 20 (hereinafter referred to as "card substrates 20") can be optionally inserted into this card slot 18.

The card substrate 20 is equipped with a circuit for converting the format of picture signals generated by the camera device 10 into a specific format and outputting the converted signals. Specific examples of the card substrate 20 include: an analog card substrate for converting the format of digital picture signals into an analog signal format (analog R/G/B signals, analog Y/C signals, etc.); a serial digital interface card substrate (hereinafter referred to as an "SDI card substrate") for converting the format of digital picture signals into an SDI signal format; a digital video card substrate (hereinafter referred to as a "DV card substrate") for converting the format of digital picture signals into a DV signal format; and a network-transmission card substrate (hereinafter referred to as an "IP card substrate") for converting the format of digital picture signals into an Internet protocol (IP) signal format. The IP signal format is a signal format for transmitting data through a network. Herein, the network includes a LAN such as Ethernet® and a public network such as the Internet.

These plurality of types of card substrates 20 are standardized in size, connecting bus for the connector unit of the card slot 18 (e.g., compact CPI), and connector signals, and thus any of those can be inserted into the same card slot 18.

The control device 30 is a remote control including a joystick, button, dial, and so on. The control device 30 is placed close to an observer or a monitor (user) of images, and is directly connected to the camera device(s) 10 through an RS-232C/RS-422 cable or the like. The control device 30 generates a camera-operation control signal according to input by the user and transmits the camera-operation control signal to the camera device(s) 10, so as to remotely control the operation of the camera device(s) 10.

For example, by transmitting pan/tilt control signals for driving the image-pickup unit of the camera device 10 in pan/tilt directions, the control device 30 can turn the image-pickup unit by predetermined angles in pan/tilt directions so as to change the image-pickup directions. Further, by transmitting an image-pickup-condition control signal for the image-pickup unit of the camera device 10, the control device 30 can control the image-pickup condition of the camera device 10, such as a shutter speed and a white balance, so as to adjust the image quality. Further, by transmitting a lens control signal for controlling the operation of the lens of the camera device 10, the control device 30 can control the zoom, iris, and focus of the lens.

In this way, the control device 30 according to the embodiment is configured so that the entire control, such as control of the image-pickup condition of the camera device 10, control of drive in pan/tilt directions, and control of the lens, can be performed by the single device. However, the present invention is not limited to this embodiment, but a plurality of controllers for individually performing these control operations can be provided. Also, by connecting one control device 30 to the plurality of camera devices 10 (two camera devices in FIG. 1), the plurality of camera devices 10 can be controlled by the single control device 30. The control device 30 is not limited to the control-only device as shown in FIG. 1, but may be realized by installing a control application onto a computer device (e.g., general-purpose personal computer). In that case, the user can control the operation of the camera devices 10 through a GUI by operating a mouse or a keyboard. Alternatively, the control device 30 may include an infrared remote control or the like, so that a camera-operation control signal can be transmitted in a wireless manner.

The switching device 40 is a switcher which switches picture signals input from a plurality of the camera devices 10 and outputs the signals to the monitor device 50 or the recording/playback device 60. The switching device 40 is connected to, for example, the control device 30, so that the user can instruct the switching device 40 to switch the picture signals by using the control device 30.

The monitor device 50 displays, for example, picture signals input from the switching device 40. The recording/playback device 60 records picture signals input from the switching device 40 on various recording media or HDD and plays back recorded picture signals, so as to output the picture signals to the monitor device 50 and to display the picture signals thereon.

As described above, in the remote image-pickup system 1, by selectively inserting the card substrates 20 into the card slot 18 of the camera device 10, various formats of picture signals can be obtained from the camera device 10 and the picture signals can be output to an external apparatus (e.g., monitor device 50 or recording/playback device 60). Accordingly, only by inserting the card substrate 20 corresponding to an external device or an application used for picture-signal processing (display processing or recording processing) or the application of the remote image-pickup system 1, the camera device 10 can output picture signals of an appropriate format desired by the user. In this way, by expanding the format of picture signals output from the camera device 10, the remote image-pickup system 1 can flexibly respond to various needs of users. Further, since a plurality of converting circuits for converting the format of picture signals to various formats need not be incorporated in the camera device 10, an increase in the size and price of the camera device 10 can be prevented.

Next, the configuration of the remote image-pickup system 1 in a case where picture signals from the camera device 10 are transmitted over long distances will be described with reference to FIG. 2. The remote image-pickup system 1 which has the configuration shown in FIG. 2 is adopted when the distance between the camera device 10 and the control device 30/the monitor device 50 is relatively long (e.g., several hundred meters or more). Specifically, this configuration is adopted when an image-pickup site and a site where images are observed/monitored are far from each other in a large construction, such as a high-rise building or a hospital, or when both sites are in different constructions or inside and outside of a construction, respectively.

In this case, as shown in FIG. 2, the remote image-pickup system 1 includes an optical-transmission card substrate 250; an optical-fiber cable 80; a relay device 90; and the above-described various card substrates 20 (analog substrate, SDI substrate, DV substrate, IP substrate, etc.), which are to be inserted into an option card slot 94 of the relay device 90, in addition to the above-described camera device 10; the control device 30; the switching device 40; the monitor device 50; and the recording/playback device 60.

As shown in FIG. 2, the optical-transmission card substrate 250 is inserted into the card slot 18 of the camera device 10. The optical-transmission card substrate 250 is a card substrate for converting the format of digital picture signals generated by the camera device 10 into a format which can be transmitted through the optical-fiber cable 80 and transmitting the converted signals. This optical-transmission card substrate 250 is standardized in size, connector unit connected to the card slot 18, and connector signals, which are in common with the above-described various card substrates 20 (analog substrate, SDI substrate, etc.). The optical-fiber cable 80 is connected to the connector unit of the optical-transmission card substrate 250. The optical-transmission card substrate 250 converts an electric digital picture signal input from the camera device 10 to an optical signal and transmits the optical signal to the relay device 90 through the optical-fiber cable 80.

The optical-fiber cable 80 includes, for example, a 2-conductor multi optical-fiber cable having a length of several hundred meters or more. Picture signals and control signals, such as camera-operation control signals and synchronizing signals, can be transmitted bidirectionally through the optical-fiber cable 80 between the camera device 10 and the relay device 90.

The relay device 90 is a device (interface unit) for relaying picture signals between the camera device 10 and an external device (the monitor device 50, the recording/playback device 60, etc.). The relay device 90 receives, for example, an optical digital picture signal from the optical-transmission card substrate 250 through the optical-fiber cable 80 and converts the optical signal to an electric digital picture signal. The relay device 90 outputs the converted picture signal from a picture output terminal and supplies it to the monitor device 50 or the recording/playback device 60 via the switching device 40.

Further, the relay device 90 has the option card slot 94 (hereinafter referred to as a "card slot 94"), which has substantially the same configuration as that of the card slot 18 of the camera device 10. The above-described various card substrates 20 (analog substrate, SDI substrate, DV substrate, etc.) can be inserted into the card slot 94. Therefore, the relay device 90 is capable of outputting various formats of picture signals (SDI signal, DV signal, analog RGB signals, etc.) in accordance with the inserted card substrate 20. Accordingly, even when the camera device 10 and the relay device 90 are far apart from each other, picture signals of a desired format according to the device or application used by a user or the use can be obtained from the relay device 90, so that the expandability of the format of picture signals, which has been described with reference to FIG. 1, can be maintained. Further, by inserting the optical-transmission card substrate 250 into the card slot 94 of the relay device 90, picture signals and so on can be transmitted/received to/from another relay device 90 placed in another location.

In the example shown in FIG. 2, the control device 30 is not directly connected to the camera device 10 unlike in FIG. 1, but is connected to the relay device 90 through an RS-232C/

RS-422 cable or the like. With this configuration, a camera-operation control signal generated by the control device 30 can be transmitted through the relay device 90 and the optical-fiber cable 80 to the camera device 10 over a long distance. Specifically, the camera-operation control signal generated by the control device 30 is input to the relay device 90 and is converted to an optical signal. Then, the optical signal is transmitted over a long distance through the optical-fiber cable 80 and is converted to an electric signal by the optical-transmission card substrate 250, and then the electrical signal is input to the camera device 10. With this configuration, even when the camera device 10 and the control device 30 are far apart from each other, the control device 30 can control the image-pickup condition, drive in pan/tilt directions, and the motion of the lens of the camera device 10.

Alternatively, the control device 30 may be integrated with the relay device 90 or the switching device 40 in one unit. Although only one camera device 10 is provided in the remote image-pickup system 1 in FIG. 2, the present invention is not limited to this configuration, but a plurality of camera devices 10 may be provided. In that case, a method for transmitting a picture signal may vary depending on the distance over which the picture signals is transmitted. For example, if the camera device 10 is at a remote location, the optical-transmission card substrate 250 is inserted into the camera apparatus 10, so that a picture signal is transmitted to the relay device 90 over a long distance. If the camera device 10 is at a nearby location, the card substrate 20 such as an SDI card substrate is inserted into the camera apparatus 10, so that a picture signal is directly transmitted to the switching apparatus 40 or the like over a short distance.

Figure 3:
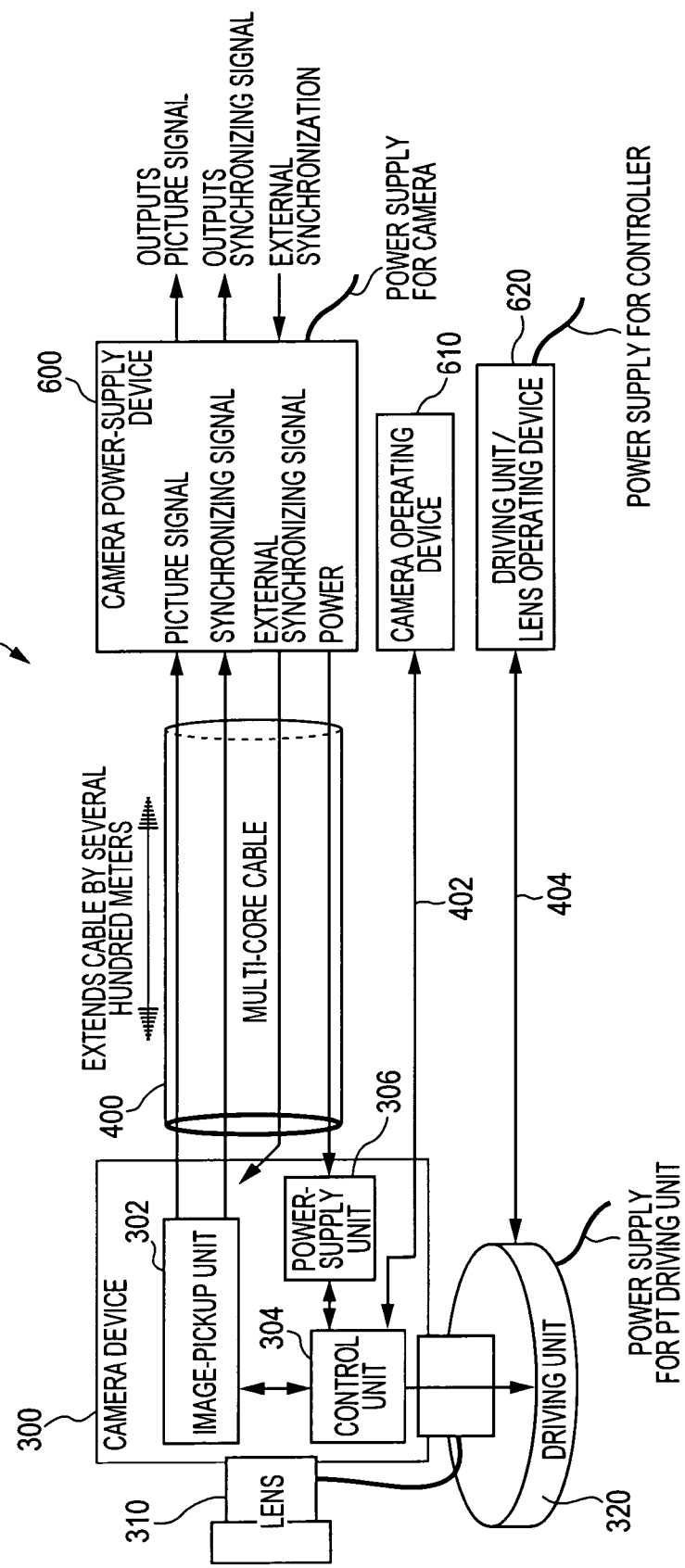
FIG. 3 is a block diagram schematically showing the main part of a known remote image-pickup system.
Figure 4:
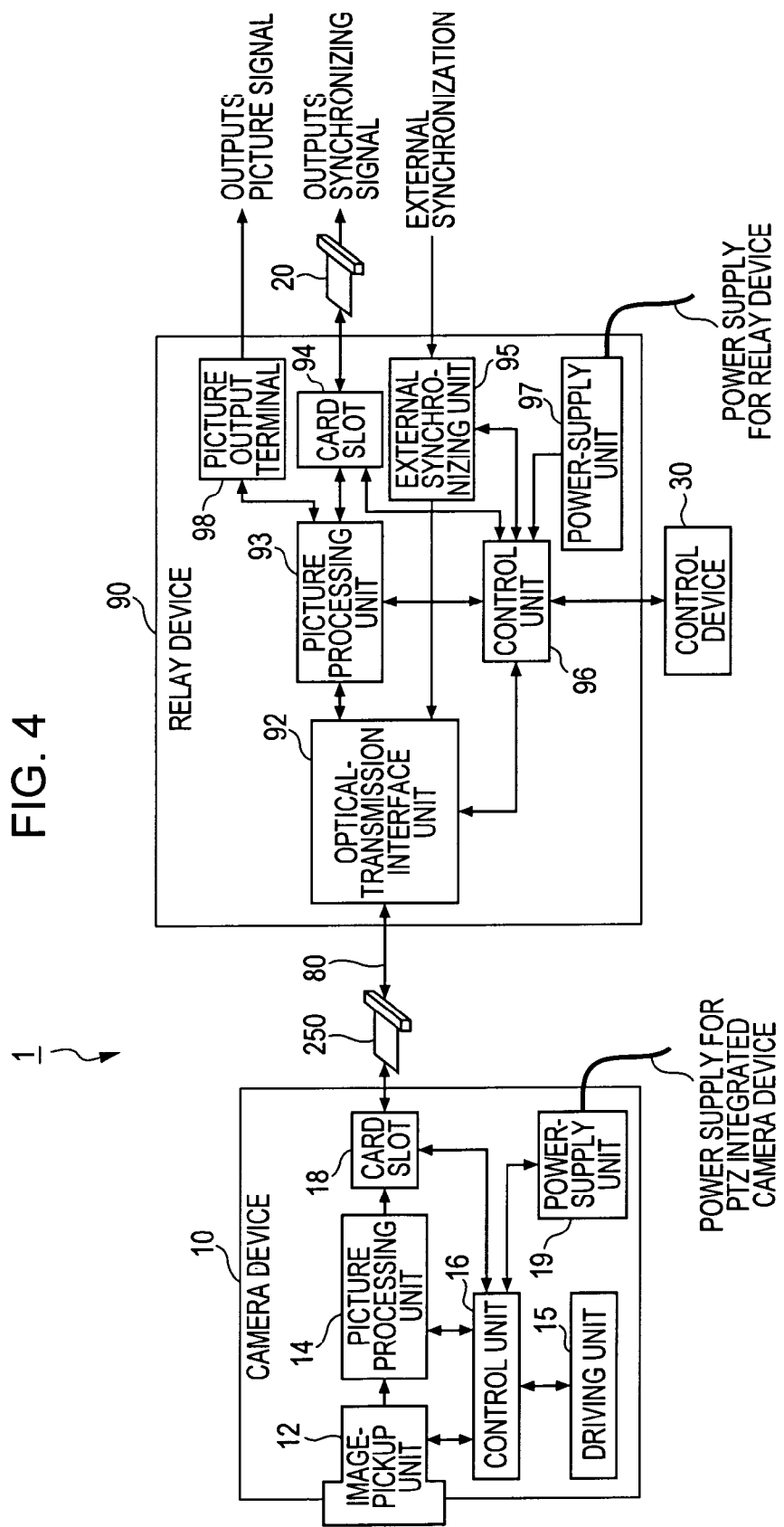
FIG. 4 is a block diagram schematically showing the main part of the remote image-pickup system according to the embodiment of the present invention.

Now, the configuration of the remote image-pickup system 1 according to the embodiment shown in FIG. 2 and that of the known remote image-pickup system 2 are described while comparing the both systems, with reference to FIGS. 3 and 4. FIG. 3 is a block diagram which schematically shows the main part of the known remote image-pickup system 2, and FIG. 4 is a block diagram which schematically shows the main part of the remote image-pickup system 1 according to the embodiment.

As shown in FIG. 3, in the known remote image-pickup system 2, a camera device 300 including an image-pickup unit 302; a control unit 304; and a power-supply unit 306, a lens 310, and a driving unit 320 serving as a pan head (camera platform) capable of performing pan/tilt operations are separated. Further, the camera device 300 and the driving unit 320 are connected to a camera power-supply device 600, a camera operating device 610, and a driving unit/lens operating device 620 at a remote location, through a plurality of communication cables.

Specifically, the image-pickup unit 302 and the power-supply unit 306 of the camera device 300 are connected to the camera power-supply device 600 through a multi-core cable 400 consisting of a plurality of cables for transmitting/receiving picture signals, synchronizing signals, external synchronizing signals, and electric power. The control unit 304 of the camera device 300 is connected to the camera operating device 610 through a communication cable 402 for transmitting image-pickup-condition control signals. The driving unit 320 is connected to the driving unit/lens operating device 620 through a communication cable 404 for transmitting pan/tilt control signals and lens control signals.

In this way, the known remote image-pickup system 2 includes many complicated connecting cables, and these cables need be extended. Therefore, many problems arise in wiring installation and in the operation of the image-pickup device. Further, since each device is separate from each other, the price of the entire system is high. Further, when the transmission distance of various signals is extended, delay of a signal occurs depending on the extended distance because all the signals are transmitted in an analog format and thus degradation of the level of each signal must be prevented.

In contrast to the known art, in the remote image-pickup system 1 according to the embodiment shown in FIG. 4, the optical-transmission card substrate 250 is inserted into the card slot 18 of the camera device 10, and the camera device 10 is connected to the relay device 90 through the optical-fiber cable 80. With this configuration, all signals including picture signals, synchronizing signals, and camera-operation control signals can be transmitted in a digital optical signal format over a long distance through the optical-fiber cable 80 between the camera device 10 and the relay device 90. Therefore, wiring can be easily installed and changes of each device can be flexibly accepted. Furthermore, even if the cable is extended by more than several hundred meters and if picture signals of high quality and high resolution generated by the 3CCD camera or camera control signals are bidirectionally transmitted, degradation of the level of the signals and delay of the signals can be effectively prevented. Further, since the image-pickup unit 12 (including a lens) is integrated with the driving unit 15, the size and price of the image-pickup device (camera device 10) can be reduced.

The main internal configuration of the camera device 10 and the relay device 90 will be further described with reference to FIG. 4.

The camera device 10 includes, for example, the image-pickup unit 12 for capturing an image of a subject and generating picture signals; a picture processing unit 14 for processing the picture signals input from the image-pickup unit 12; the driving unit 15 for turning the image-pickup unit 12 in pan/tilt directions; a control unit 16 for controlling each unit in the camera device 10; the card slot 18; and a power-supply unit 19 for supplying electric power from an AC adapter or the like to each unit of the camera device 10. In the example shown in FIG. 4, the optical-transmission card substrate 250 is inserted into the card slot 18, and the camera device 10 and the relay device 90 are connected to each other through the optical-fiber cable 80.

On the other hand, the relay device 90 includes, for example, an optical-transmission interface unit 92 for transmitting/receiving various signals to/from the camera device 10 through the optical-fiber cable 80; a picture processing unit 93 for processing received picture signals; the card slot 94 to which the card substrate 20 is inserted and which outputs picture signals input from the picture processing unit 93; an external synchronizing unit 95 for performing external synchronization processing, such as adjustment of the phase of picture signals, based on an external synchronizing signal input from the outside; a control unit 96 for controlling each unit of the relay device 90 and receiving camera-operation control signals from the control device 30; a power-supply unit 97 for supplying electric power from an AC adapter or the like to each unit of the relay device 90; and a picture output terminal 98 for outputting picture signals from the picture processing unit 93.

Hereinafter, a specific configuration of the camera device 10 according to the embodiment will be described.

First, the appearance of the camera device 10 according to the embodiment will be described with reference to FIGS. 5A to 5C. FIG. 5A is a front view of the camera device 10 according to the embodiment, FIG. 5B is a right-side view thereof, and FIG. 5C is a back view thereof.

Figure 5C:
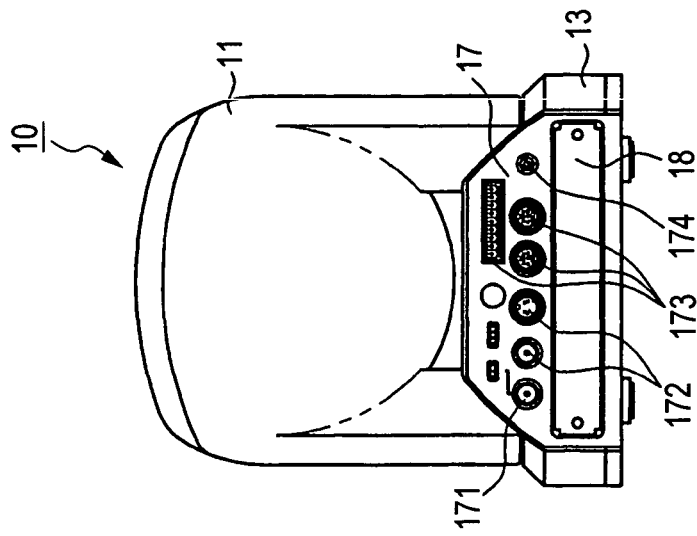
FIGS. 5A, 5B, and 5C are a front view, a right-side view, and a back view, respectively, showing the appearance of the camera device according to the embodiment.
Figure 5B:
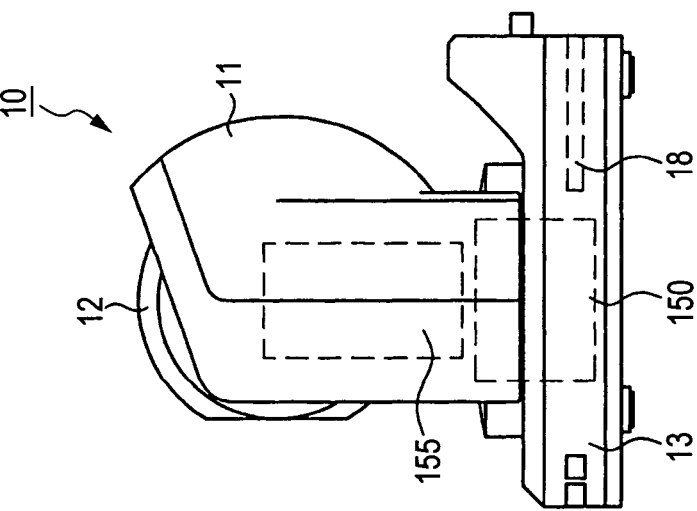
Figure 5A:
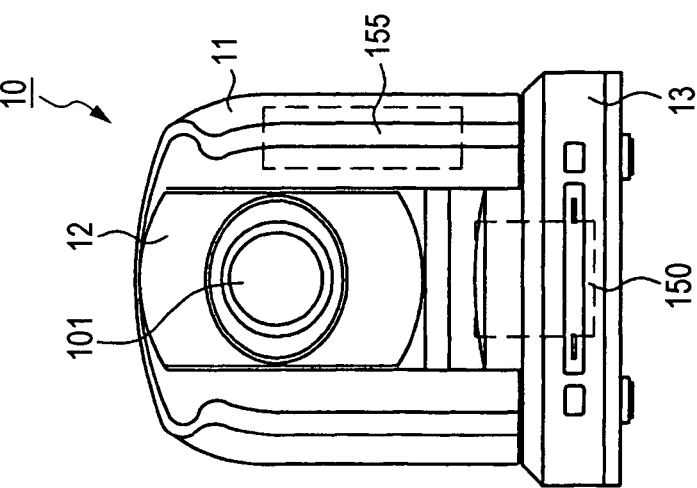

As shown in FIGS. 5A to 5C, the camera device 10 includes the image-pickup unit 12, an image-pickup-unit supporter 11; and a base unit 13.

The image-pickup unit 12 captures an image of a subject to which the lens 101 is directed and generates picture signals. The internal configuration of the image-pickup unit 12 will be described later.

The image-pickup-unit supporter 11 covers the right, left, and back sides of the image-pickup unit 12 and supports the image-pickup unit 12 such that the image-pickup unit 12 is rotatable in tilt directions. A tilt driving unit 155 is disposed inside the image-pickup-unit supporter 11. The tilt driving unit 155 includes, for example, a tilt motor such as a stepping motor; a tilt gear unit which includes a gear, a worm, and a tilt rotating shaft and which transfers the driving force of the tilt motor; and a tilt-motor driver for controlling the tilt motor. The tilt driving unit 155 is capable of rotating the image-pickup unit 12 in tilt directions based on a control signal from the control unit 16. Accordingly, the image-pickup direction of the image-pickup unit 12 can be changed in tilt directions.

The base unit 13 is placed at the bottom of the camera device 10 and is mounted on the wall, ceiling, or floor of a construction. The base unit 13 supports the image-pickup-unit supporter 11 such that the image-pickup-unit supporter 11 is rotatable in pan directions. A pan driving unit 150 is disposed inside the base unit 13. The pan driving unit 150 includes, for example, a pan motor such as a stepping motor; a pan gear unit which includes a gear, a worm, and a pan rotating shaft and which transfers the driving force of the pan motor; and a pan-motor driver for controlling the pan motor. The pan driving unit 150 is capable of rotating the image-pickup-unit supporter 11 the image-pickup unit 12 in pan directions based on a control signal from the control unit 16. Accordingly, the image-pickup direction of the image-pickup unit 12 can be changed in pan directions. The pan driving unit 150 and the tilt driving unit 155 form the above-described driving unit 15.

In this way, the camera device 10 is formed as a pan/tilt/zoom driving mechanism-integrated 3CCD camera in which the image-pickup unit 12 including the lens 101 and the pan/tilt driving units 150 and 155 are integrated, so that the entire device can be miniaturized.

As shown in FIG. 5C, a connector unit 17 including a plurality of input/output terminals and the opening of the card slot 18 are disposed on the back side of the camera device 10. The connector unit 17 includes, for example, a synchronizing-signal input terminal 171; picture-signal output terminals 172; camera-operation control signal input/output terminals 173 (e.g., RS-232C/RS-422 terminals); and a power-supply input terminal 174. The terminals of the connector unit 17 are arranged in substantially the horizontal direction, and the card slot 18 is disposed under the connector unit 17 such that the card slot 18 is substantially parallel with the connector unit 17. With this arrangement, the height of the camera device 10 can be reduced and the entire device can be miniaturized.

Next, a specific configuration of the image-pickup unit 12 (3CCD camera block) of the camera device 10 according to the embodiment will be described with reference to FIG. 6. FIG. 6 is a block diagram showing the configuration of the image-pickup unit 12 of the camera device 10 according to the embodiment.

As shown in FIG. 6, an optical image entered through the lens 101 passes through various filters (not shown), is separated into R, G, and B light beams by a prism (not shown), and then the three light beams enter a 3-plate CCD 102. The 3-plate CCD 102 consists of three CCDs for R, G, and B, and is capable of capturing an entered optical image and converting the optical image into electric signals corresponding to R, G, and B colors, respectively. The 3-plate CCD 102 is driven by a timing generator 116 and reads picture signals, which are electric signals after photoelectric conversion, as necessary. The shutter speed of the timing generator 116 is controlled by a camera controller 110.

The electric signals output from the 3-plate CCD 102 are input to a correlated double sampling (CDS) circuit 103, where a picture component is extracted from each electric signal, and then the extracted picture components are A/D-converted to RGB digital picture signals by an A/D converter 105. The digital picture signals obtained in this manner are processed by gamma correction and color conversion in real time by a picture-signal processing unit 106, and are then converted to a picture signal of the image size compatible with an NTSC or PAL signal by a pixel converter 107. Further, text information generated by a character generator 119 is added to the digital picture signal by a video encoder 108, and then the digital picture signal is output to the outside together with a horizontal synchronizing signal (HD) and a vertical synchronizing signal (VD), in a YCrCb 4:2:2 format, for example. Also, the digital picture signal is converted to an analog RGB signal and a Y/C signal by the video encoder 108, and the converted signals are amplified in a video amplifier 109 and are output.

An operating controller 123 receives, for example, a power-supply ON/OFF control signal, an image-pickup-condition control signal, a lens control signal among camera-operation control signals from the external control device 30, and a text signal and a key signal. The operating controller 123 uses a memory unit 121 such as an EEPROM and a clock circuit 120 in order to control ON/OFF of a power-supply unit 124 and the character generator 119 and to instruct the camera controller 110 to control the lens 101 and the picture-signal processing unit 106 based on the input signals.

The camera controller 110 communicates with the control unit 16 of the camera device 10 and controls each unit of the image-pickup unit 12 by using a memory unit 117 such as an EEPROM and an electronic volume (EVR) 118. For example, the camera controller 110 instructs a motor controller 111 to allow a motor driver 112 to drive a zoom adjusting motor 113, a focus adjusting motor 114, and an iris adjusting motor 115, so as to automatically control the zoom, focus, and iris of the lens 101.

Figures 7, 7A:
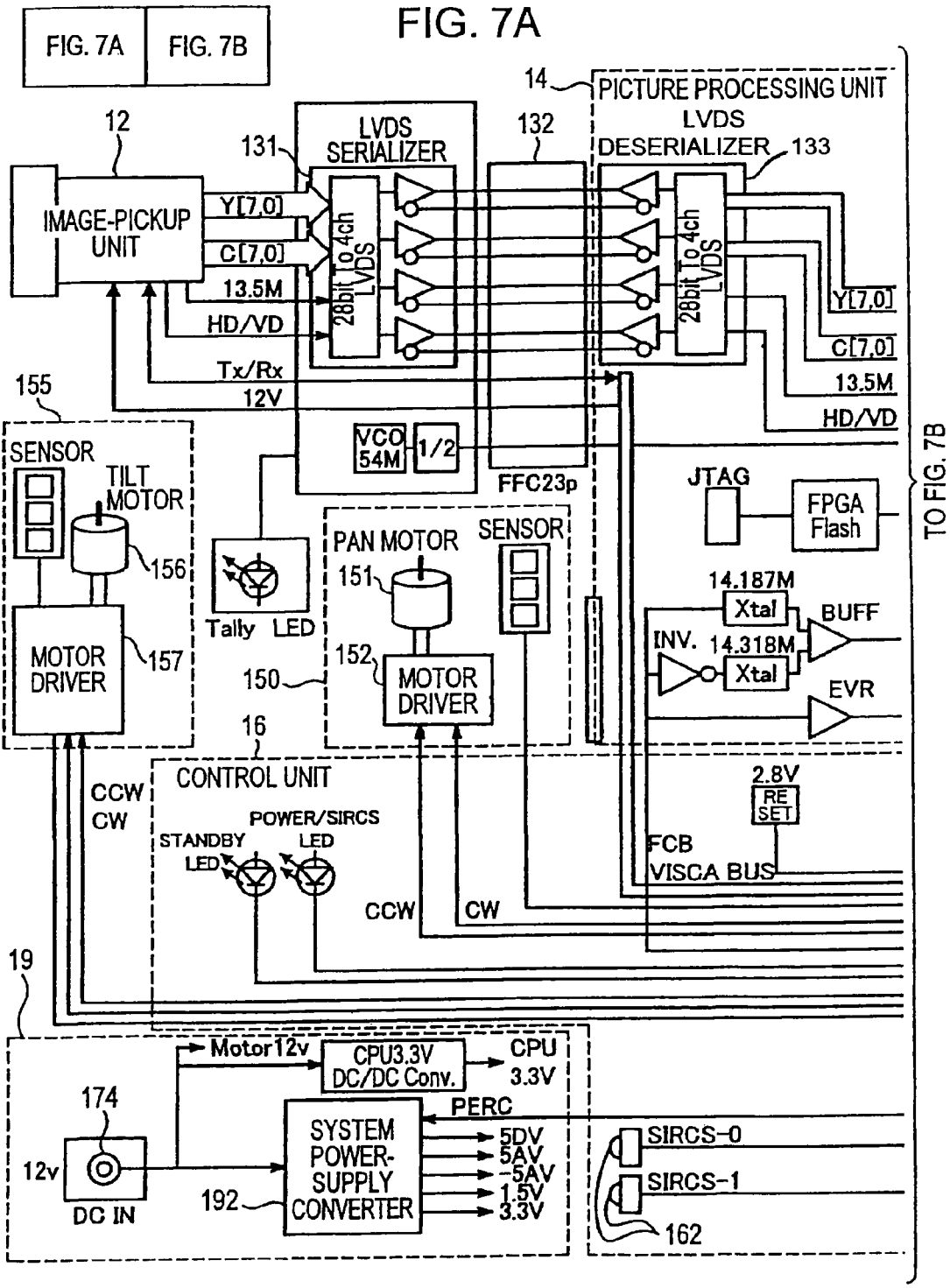
FIGS. 7A and 7B are block diagrams showing the entire circuitry configuration of the camera device according to the embodiment.
Figure 7B:
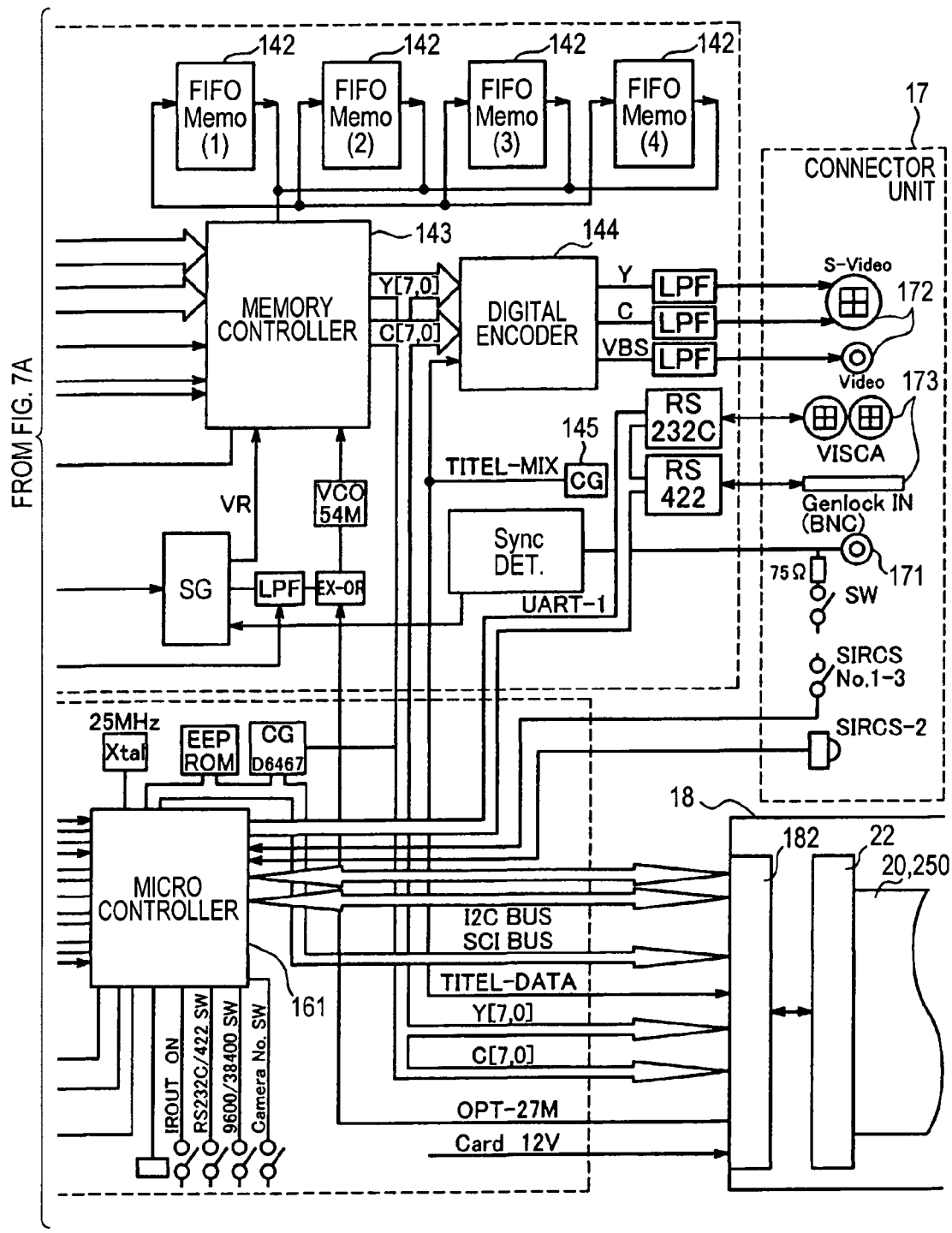

Next, the entire circuitry of the camera device 10 according to the embodiment will be described with reference to FIGS. 7A and 7B. FIGS. 7A and 7B are block diagrams showing the entire circuitry of the camera device 10 according to the embodiment.

As shown in FIGS. 7A and 7B, the camera device 10 includes, for example, the image-pickup unit 12; the picture processing unit 14; the control unit 16; the connector unit 17; the card slot 18; the power-supply unit 19; the pan driving unit 150; and the tilt driving unit 155. Among them, a circuit board (video board) of the picture processing unit 14 and a circuit board (system control board) of the control unit 16 are disposed inside the base unit 13.

Hereinafter, the entire circuitry will be described in detail. First, picture signals generated by the image-pickup unit 12 (e.g., a luminance signal (Y signal) and a chrominance signal (C signal) of 8-bit digital data) pass a low voltage differential signaling (LVDS) serializer 131 and an LVDS deserializer 133 and are input to a memory controller 143 of the picture processing unit 14. Since the image-pickup unit 12 and the base unit 13 in which the board of the picture processing unit 14 is incorporated are relatively turned in pan directions, the wiring for connecting the image-pickup unit 12 and the picture processing unit 14 must have some allowances. For this reason, the wiring at this part is formed of a flexible flat cable (FFC) 132 or the like, and thus picture signals and so on are transmitted by the LVDS serializer 131/deserializer 133 in the LVDS method.

The memory controller 143 reads the input picture signals while writing them in four FIFO (first-in first-out) memories 142 in units of fields, so that the top and bottom of the image of each field represented by the picture signals are reversed. This process is effective when the camera device 10 is disposed on the ceiling or the like and when the top and bottom of the image of the picture signals are reversed. Also, with this process, the top and bottom of the image can be reversed while preventing distortion of the image. Additionally, the memory controller 143 is capable of performing external synchronization processing of picture signals based on an external synchronizing signal input from the external-synchronizing-signal input terminal 171.

A digital encoder 144 converts the digital picture signals output from the memory controller 143 to analog picture signals to which text information generated by the character generator 145 is added. The analog picture signals include, for example, Y and C signals and a VBS signal (video burst sync signal: color television signal with a synchronizing signal). These analog picture signals compatible with the TV format can be output from the picture-signal output terminals 172 and 173 in real time.

A micro controller 161 of the control unit 16 controls the entire camera device 10, including the pan motor 151, the tilt motor 156, an infrared-receiving remote control 162, and the image-pickup unit 12. More specifically, the micro controller 161 controls the image-pickup condition of the image-pickup unit 12 and the operation of the lens 101 based on an image-pickup-condition control signal and a lens control signal input from the camera-operation control signal input terminal 171 or the optical-transmission card substrate 250. Also, the micro controller 161 outputs CW and CCW signals to the motor driver 152 of the pan driving unit 150 and the motor driver 157 of the tilt driving unit 155 based on a pan control signal and a tilt control signal input from the camera-operation control signal input terminal 171 or the optical-transmission card substrate 250, so as to control the drive of the pan motor 151 and the tilt motor 156. Further, the micro controller 161 is capable of controlling the pan/tilt driving of the image-pickup unit 12 based on a serial infrared remote control system (SIRCS) signal from the infrared-receiving remote control 162.

A power-supply voltage input from the power-supply terminal 174 of the power-supply unit 19 is converted to a predetermined voltage required in the camera device 10 by a system power-supply converter 192 and is supplied to each unit.

Any of the analog, SDI, DV card substrates 20 or the optical-transmission card substrate 250 is inserted into the card slot 18. The card connector unit 22 of the card substrates 20 and 250 and a backboard connector unit 182 of the card slot 18 have a standardized pin assignment, and both connector units are connected to each other according to a compact PCI (peripheral component interconnect) standard.

The card substrate 20 or 250 connected in this manner transmits/receives various signals to/from the camera device 10. For example, various control signals including a camera-operation control signal are serially transmitted between the control unit 96 of the relay device 90 connected via the control unit (micon) of the card substrate 20 or the optical-transmission card substrate 250 and the micro controller 161 of the camera device 10. In an I2C bus, signals are transmitted to/from the analog card substrate 20. In an SCI bus, an electronic-volume adjusting signal is transmitted. Also, title information and so on generated by the character generator 145 is output to the card substrate 20 or 250. Further, the memory controller 143 outputs digital picture signals (e.g., 8-bit digital Y and C signals) to the card substrate 20 or 250. Also, an electric power (e.g., 12 V) is supplied from the camera device 10 to the card substrate 20 or 250.

Additionally, a card identifying pin or the like (not shown) is provided in the backboard connector 182 of the card slot 18. By using the card identifying pin, the micro controller 161 determines whether or not the card substrate 20 or 250 is in the card slot 18, and determines the type of the card substrate 20 or 250 if it is inserted. Accordingly, the micro controller 161 can control signals transmitted to/from the card substrate 20 or 250 according to the type of the card substrate 20 or 250. In this way, the micro controller 161 and the card identifying pin or the like function as a card identifying unit according to the embodiment.

Next, the configuration of an SDI card substrate 210 and an analog card substrate 220, which are kinds of the card substrate 20 according to the embodiment, and the configuration of the optical-transmission card substrate 250 will be described in detail.

Figure 8:
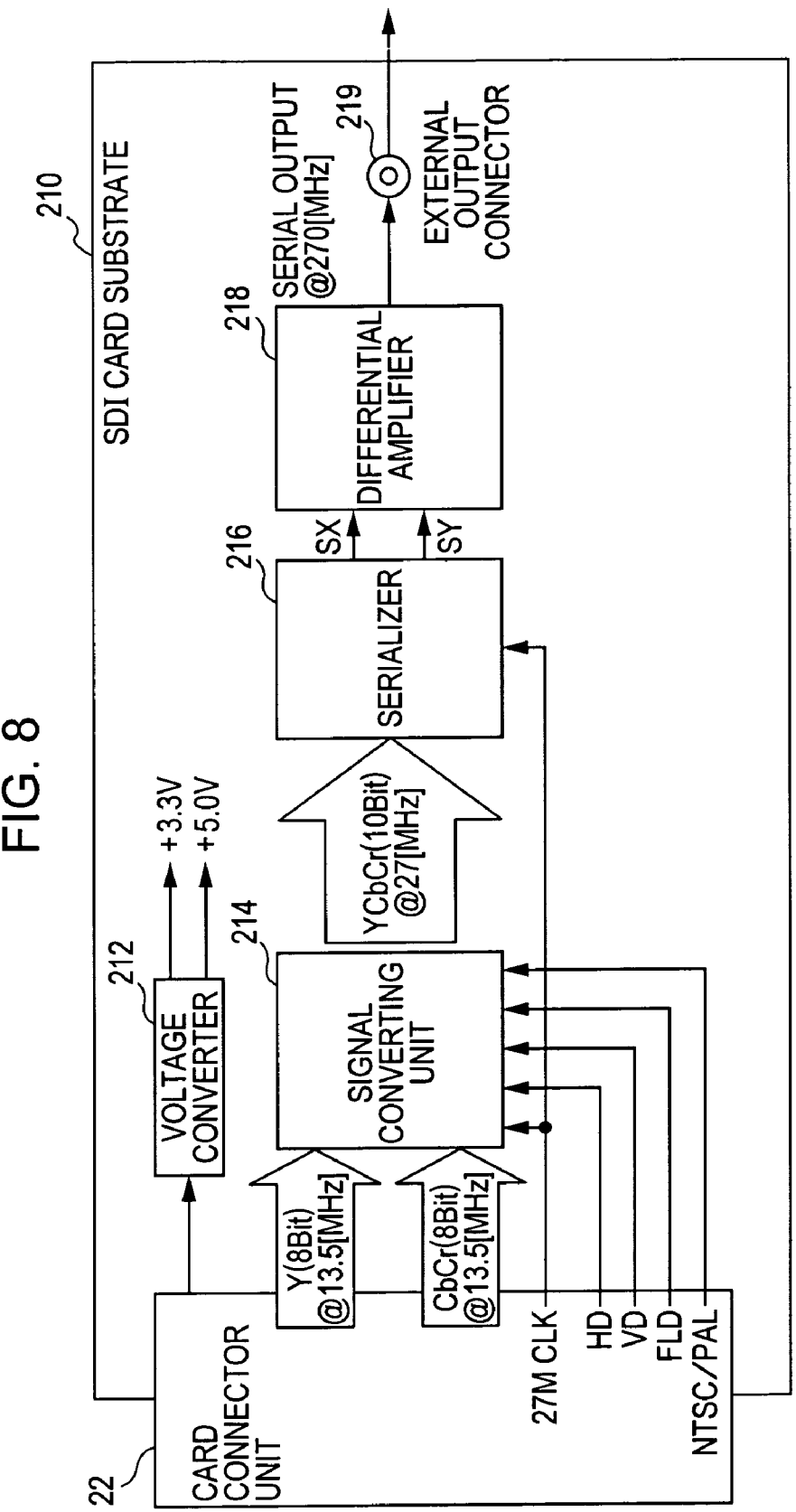
FIG. 8 is a block diagram showing the configuration of an SDI card substrate according to the embodiment.

First, the configuration of the SDI card substrate 210 according to the embodiment will be described with reference to FIG. 8. FIG. 8 is a block diagram showing the configuration of the SDI card substrate 210 according to the embodiment.

As shown in FIG. 8, the SDI card substrate 210 includes the card connector unit 22 which is formed of a compact PCI connector or the like and which is connected to the card slot 18 of the camera device 10; a voltage converter 212; a signal converting unit 214 including a field programmable gate array (FPGA) circuit; a serializer 216; a differential amplifier 218; and an external output connector 219 formed of a bayonet Neill-Concelman (BNC) connector.

A power-supply voltage (DC of 12 V) is supplied from the camera device 10 to the voltage converter 212, which generates voltages of +3.3 V and +5.0 V used in each circuit of the SDI card substrate 210 and supplies the voltages to each circuit.

The signal converting unit 214 converts digital picture signals input from the camera device 10 via the card connector unit 22, such as an 8-bit Y signal and an 8-bit 4:2:2 Cr/Cb signal into picture data by using a multiplexing circuit of an 8-bit width at a 27-MHz clock. Also, the signal converting unit 214 adds a checksum signal to each of the picture signal and a synchronizing signal. Further, the signal converting unit 214 converts the picture signal and so on into a signal compatible with the SMPTE259M standard based on a horizontal synchronizing signal (hereinafter referred to as HD) and a vertical synchronizing signal (VD). The signal converting unit 214 outputs the digital signal which has been converted to 10-bit picture data to the serializer 216.

The serializer 216 converts the input 10-bit parallel signal to a 10× serial signal and outputs the serial signal to the differential amplifier 218. The differential amplifier 218 drives the serial signal to the level compatible with the standard and outputs the signal through the external output connector 219.

In this way, the SDI card substrate 210 is capable of converting digital picture signals input from the camera device 10 to an SDI signal, which is excellent in transmission speed, transmission distance, and resistance to signal degradation, and outputting the signal to the outside. The SID signal includes, for example, a Dl-SDI signal (SMPTE259M-C standard) and an HD-SDI signal (SMPTE292M standard).

Figure 9:
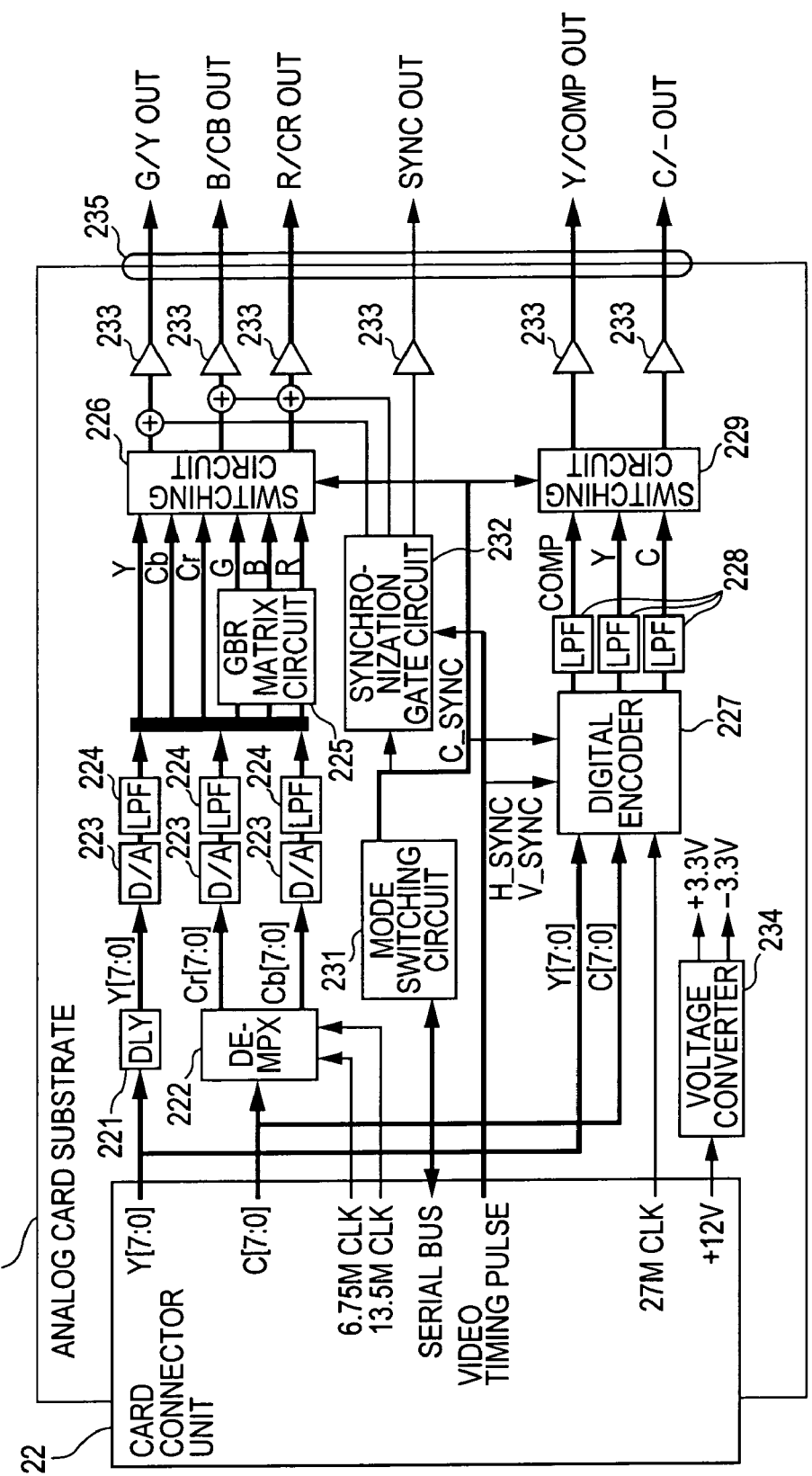
FIG. 9 is a block diagram showing the configuration of an analog card substrate according to the embodiment.

Next, the configuration of the analog card substrate 220 according to the embodiment will be described with reference to FIG. 9. FIG. 9 is a block diagram showing the configuration of the analog card substrate 220 according to the embodiment.

As shown in FIG. 9, the analog card substrate 220 includes, for example, the card connector unit 22 which is formed of a compact PCI connector or the like and which is connected to the card slot 18 of the camera device 10; a DLY circuit 221, a demultiplexer 222; a D/A converter 223; a low-pass filter 224; a GBR matrix circuit 225; switching circuits 226 and 229; a digital encoder 227; a low-pass filter 228; a mode switching circuit 231; a synchronization gate circuit 232; a display processing circuit 233; a voltage converter 234; and an external output connector 235 formed of a 9-pin D-SUB connector or the like.

A power-supply voltage (DC of 12 V) is supplied from the camera device 10 to the voltage converter 234, which generates voltages of +3.3 V and −3.3 V used in each circuit of the analog card substrate 220 and supplies the voltages to each circuit.

An 8-bit Y signal and an 8-bit 4:2:2 Cr/Cb signal, which are digital picture signals, are input from the camera device 10 to the card connector unit 22. These digital picture signals are separated into a Y signal, a Cr signal, and a Cb signal by the DLY circuit 221 and the demultiplexer 222. Then, the D/A converter 223 and the low-pass filter 224 perform analog conversion on the digital picture signals (Y, Cr, and Cb), so that analog Y, Cr, and Cb signals are output. When a component signal is selected, the analog picture signals (Y, Cr, and Cb) pass through the switching circuit 226 and the display processing circuit 233 and are output from the output connector 235. On the other hand, when an RGB signal is selected, the analog picture signals (Y, Cr, and Cb) are converted to RGB signals by the GRB matrix circuit 225, so that the analog RGB signals are output from the output connector 235.

The digital picture signals (Y and Cr/Cb signals) from the card connector unit 22 are also input to the digital encoder 227. These digital picture signals are converted to analog picture signals compatible with the NTSC/PAL standard: a composite picture signal and Y/C separated signals, by the digital encoder 227. Then, the analog picture signals pass through the low-pass filter 228 and the display processing circuit 233 and are output from the output connector 235.

The mode switching circuit 231 is a 12CH DA circuit, for example, and sets various circuit adjustment values of the digital encoder 227 and the synchronization gate circuit 232 in accordance with NTSC/PAL-mode switching information from the camera device 10 performing serial communication. Also, the mode switching circuit 231 switches between the switching circuits 226 and 229 according to selected analog picture signals to be output after power-up. The display processing circuit 233 is a 75-Ω driver circuit, which performs 75-Ω drive when displaying each output analog picture signal on a TV monitor.

In this way, the analog card substrate 220 is capable of converting digital picture signals input from the camera device 10 to various analog picture signals, such as RGB signals, YC signals, and a composite signal, and outputting the signals to the outside.

Figure 10:
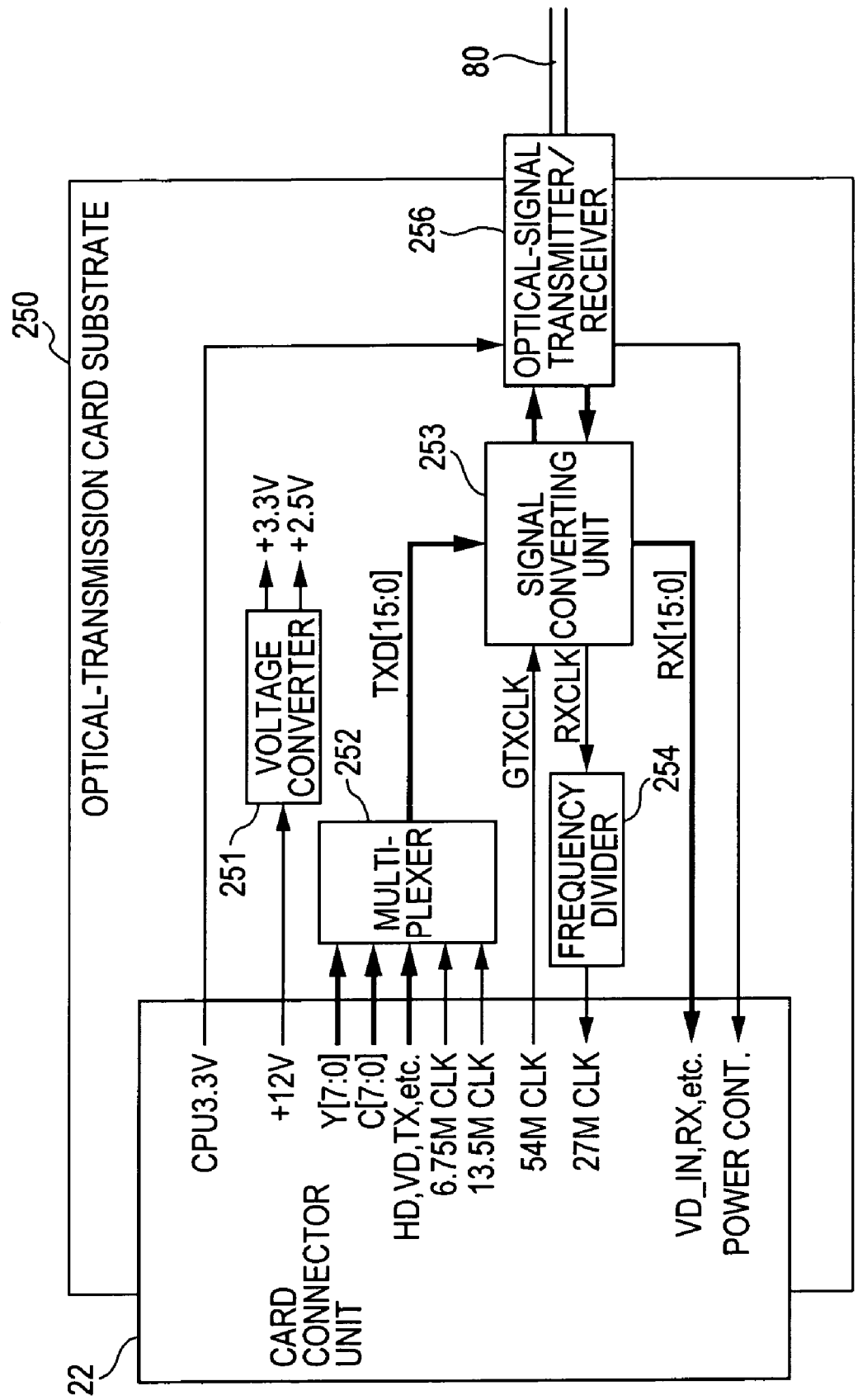
FIG. 10 is a block diagram showing the configuration of an optical-transmission card substrate according to the embodiment.

Next, the configuration of the optical-transmission card substrate 250 according to the embodiment will be described with reference to FIG. 10. FIG. 10 is a block diagram showing the configuration of the optical-transmission card substrate 250 according to the embodiment.

As shown in FIG. 10, the optical-transmission card substrate 250 includes the card connector unit 22 which is formed of a compact PCI connector or the like and which is connected to the card slot 18 of the camera device 10; a voltage converter 251; a multiplexer 252; a signal converting unit 253; a frequency divider 254; and an optical-signal transmitter/receiver 256.

A power-supply voltage (DC of 12 V) is supplied from the camera device 10 to the voltage converter 251, which generates voltages of +3.3 V and +2.5 V used in each circuit of the optical-transmission card substrate 250 and supplies the voltages to each circuit.

Digital picture signals such as an 8-bit Y signal and an 8-bit 4:2:2 Cr/Cb signal, an HD signal, a VD signal, transmission signals (Tx) including a synchronizing signal and a communication control signal, and clock signals of 13.5 MHz and 6.75 MHz are input from the camera device 10 through the card connector unit 22 to the multiplexer 252. The multiplexer 252 multiplexes these signals and outputs a 16-bit parallel digital transmission signal (TXD) to the signal converting unit 253.

The signal converting unit 253 includes, for example, a gigabit transceiver circuit including a serializer, a deserializer, and a bit converting circuit. The signal converting unit 253 converts the parallel signal input from the multiplexer 252 into a serial signal based on a reference clock signal (GTX CLK) such as a 54-M clock signal and outputs the serial signal to the optical-signal transmitter/receiver 256. Also, the signal converting unit 253 converts a serial signal input from the optical-signal transmitter/receiver 256 to a parallel signal and outputs it to the camera device 10.

The optical-signal transmitter/receiver 256 includes a laser module such as a small form factor pluggable (SFP) module. The optical-signal transmitter/receiver 256 converts a digital electric signal input from the signal converting unit 253 to an optical signal and transmits it to the relay device 90 through the optical-fiber cable 80. Also, the optical-signal transmitter/receiver 256 converts an optical signal received from the relay device 90 through the optical-fiber cable 80 to a digital electric signal and outputs it to the signal converting unit 253.

The signal converting unit 253 processes signals received from the relay device 90 (various control signals such as a camera-operation control signal and an external synchronizing signal) and outputs 16-bit reception signals (Rx), such as a VD_IN signal and an RX signal used in the camera device 10, to the camera device 10. The frequency divider 254 performs frequency division on a 54-M clock signal received from the relay device 90 and outputs a 27-M clock signal. Based on this clock signal, clock synchronization is performed in the camera device 10.

In this way, the optical-transmission card substrate 250 is capable of converting digital picture signals and so on input from the camera device 10 to a serial optical signal and transmitting the optical signal to the relay device 90 through the optical-fiber cable 80. Also, the optical-transmission card substrate 250 is capable of receiving an optical signal from the relay device 90 through the optical-fiber cable 80, converting various control signals included in this optical signal to parallel electric signals, and outputting the signals to the camera device 10.

Next, the configuration of the optical-transmission interface unit 92 of the relay device 90 according to the embodiment will be described with reference to FIG. 11. FIG. 11 is a block diagram showing the configuration of the optical-transmission interface unit 92 of the relay device 90 according to the embodiment.

As shown in FIG. 11, the circuitry configuration of the optical-transmission interface unit 92 corresponds to that of the above-described optical-transmission card substrate 250. The optical-transmission interface unit 92 includes, for example, an optical-signal transmitter/receiver 922; a signal converting unit 923; and a demultiplexer 924. Among them, the optical-signal transmitter/receiver 922 and the signal converting unit 923 have substantially the same configuration as that of the optical-signal transmitter/receiver 256 and the signal converting unit 253 of the optical-transmission card substrate 250, respectively.

The optical-signal transmitter/receiver 922 receives a serial optical signal including picture signals and so on from the optical-transmission card substrate 250 through the optical-fiber cable 80 and converts the optical signal to a serial digital electric signal. Then, the digital electric signal is converted to a parallel signal by the signal converting unit 923 and is bit-converted to an Rx signal. The Rx signal is separated (demodulated) into picture signals (8-bit Y signal, Cr signal, and Cb signal), an HD signal, a VD signal, and various clock signals by the demultiplexer 924 based on a reference clock signal (GTX CLK) such as a 54-M clock signal or the like, and these signals are output to the above-described picture processing unit 93.

Various control signals, such as a camera-operation control signal from the control device 30, an external synchronizing signal from the external synchronizing unit 95, a VD_OUT signal, and a MIU_TX signal, are converted to a serial signal by the signal converting unit 923, further converted to an optical signal by the optical-signal transmitter/receiver 922, and then transmitted through the optical-fiber cable 80 to the camera device 10.

In this way, the optical-signal transmitter/receiver 922 of the relay device 90 is capable of transmitting/receiving picture signals, synchronizing signals, and various control signals such as a camera-operation control signal to/from the optical-transmission card substrate 250 inserted into the camera device 10 through the optical-fiber cable 80.

Up to this, the remote image-pickup system 1 of the embodiment, and the camera device 10, the card substrates 20, the relay device 90, and so on forming the remote image-pickup system 1 have been described in detail. According to the remote image-pickup system 1, by providing the card slot 18 in the camera device 10 and inserting one of the various card substrates 20 into the card slot 18 so as to convert picture signals, various formats of picture signals, such as analog signals (RGB signals and Y/C signals), digital signals (SDI, DV, and IP signals), and other formats of signals which will be developed in the future, can be output to an external device. Therefore, the remote image-pickup system 1 is flexibly adaptable to devices and applications on the picture processing side and to various uses (e.g., for observation or monitoring) and is excellent in expandability. Further, the camera device 10 need not include a plurality of picture-converting circuits for converting picture signals into signals of various formats, but only has to include a minimum circuit board. Therefore, the size and price of the camera device 10 can be reduced.

Further, by inserting the optical-transmission card substrate 250 into the camera device 10, picture signals can be transmitted over a long distance through the optical-fiber cable 80 from the camera device 10 to the relay device 90. Therefore, the picture signals can be preferably transmitted over a long distance while minimizing degradation of the level of the signal and delay of the signal. Further, by transmitting control signals such as a camera-operation control signal and an external synchronizing signal through the optical-fiber cable 80 from the relay device 90 to the camera device 10, the wiring for connecting the camera device 10 and the relay device 90 can be minimized to one optical-fiber cable 80. With this configuration, the remote image-pickup system 1 is excellent in wiring installation and is flexibly adaptable to change of devices and change of formats of picture signals.

Further, by mounting the 3CCD camera on the image-pickup unit 12, pictures having high quality and high resolution can be output. Further, digital picture signals having a large amount of data generated by the 3CCD camera can be preferably transmitted over a long distance through the optical-fiber cable 80.

The camera device 10 is formed as a pan/tilt/zoom driving unit integrated 3CCD video camera (PTZ camera), in which the image-pickup unit 12 and the driving unit 15 are integrated together. In order to realize this configuration, the configuration and arrangement of each circuit board and driving mechanism are contrived, that is, the board of the image-pickup unit 12 (3CCD camera block) is miniaturized, and the boards of the picture processing unit 14 and the control unit 16, which are relatively large, are arranged substantially horizontally in the base unit 13.

Further, by horizontally arranging the connector unit 17 and the card slot 18 on the back side of the camera device 10 such that both are substantially parallel with each other and that the connector unit 17 is disposed above the card slot 18, the height of the camera device 10 can be minimized.

In this way, the image-pickup unit 12 and the driving unit 15 are integrated together while preventing an increase in the size of the entire camera device 10. With this configuration, the number of devices for capturing images can be reduced, the price of the entire system can also be reduced, and the compact camera device 10 suitable for observation and monitoring can be provided. Also, all the controlling operations (control of pan, tilt, zoom, image-pickup condition, etc.) of the camera device 10 can be easily performed by using only one control device 30.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the card substrate 20 which is to be inserted into the camera device 10 is not limited to the SDI card substrate 210, the analog card substrate 220, and the optical-transmission card substrate 250 described in the above embodiment. For example, by inserting the DV card substrate into the camera device 10, picture signals of a digital video format can be output. On the other hand, by inserting an IP card substrate, picture signals generated by the camera device 10 can be transmitted through a LAN such as Ethernet® or various networks such as the Internet and can be displayed/recorded in a picture processing terminal (PC or the like) owned by a predetermined group or an indefinite number of users. Of course, a card substrate 20 which converts the format of picture signals output from the camera device 10 to a format other than the above-described formats can be provided.

In the above-described embodiment, the camera device 10 includes one card slot 18, but alternatively, a plurality of card slots 18 may be provided. With this configuration, a plurality of card substrates 20 can be inserted into the camera device 10, so that a plurality of formats of picture signals can be output at the same time. Likewise, the relay device 90 may include a plurality of card slots 94.

The present invention can be applied to a remote image-pickup system, in particular, to a surveillance camera system and a remote monitoring system and the like.

What is claimed is:

1. A remote image-pickup system, comprising:
a camera device including
an image-pickup unit configured to capture an image of a subject and to generate video signals;
a generation unit configured to generate a luminance signal and a chrominance signal from said video signals; and
a card slot including a backboard connector, the backboard connector configured to receive the luminance signal, the chrominance signal, and a camera operation control signal separately from each other;

a plurality of card substrates configured to be individually inserted into the card slot and to connect with the backboard connector, each card substrate including a converting unit configured to convert the luminance signal and the chrominance signal to output converted signals having a format compatible with an external device; and a relay device connected to the camera device, said relay device including another card slot including another backboard connector, the another backboard connector configured to receive the luminance signal, the chrominance signal, and the camera operation control signal separately from each other, said relay device is configured to communicate said converted signals having a format compatible with an external device to a plurality of external devices remote from the image-pickup unit which perform different functions.

2. The remote image-pickup system according to claim 1, wherein the plurality of types of card substrates comprise at least one selected from the group consisting of:

an analog card substrate configured to convert the format of the video signals to an analog signal format;

a serial digital interface card substrate configured to convert the format of the video signals to a serial digital interface signal format;

a digital video card substrate configured to convert the format of the video signals to a digital video signal format; and a network-transmission card substrate configured to convert the format of the video signals to an Internet-protocol signal format.

3. The remote image-pickup system according to claim 1, wherein the plurality of card substrates comprise an optical-transmission card substrate for converting the format of the video signals to a format capable of being transmitted through an optical-fiber cable and for transmitting the converted signals.

4. The remote image-pickup system according to claim 3, further comprising a relay device connected to the optical-transmission card substrate through the optical-fiber cable and configured to relay the video signals between the camera device and the external device.

5. The remote image-pickup system according to claim 4, wherein the optical-transmission card substrate is configured to multiplex the video signals and to transmit a multiplexed video signal, and the relay device is configured to receive the multiplexed video signal from the optical-transmission card substrate and to demultiplex the multiplexed video signal.

6. The remote image-pickup system according to claim 5, wherein the optical-transmission card substrate is configured to multiplex the video signals and a synchronizing signal and to transmit a multiplexed signal.

7. The remote image-pickup system according to claim 4, wherein the relay device comprises a card slot to which the plurality of card substrates can be selectively inserted.

8. The remote image-pickup system according to claim 4, further comprising:

a control device configured to remotely control the camera device, wherein the control device is connected to the relay device, and the camera-operation control signal generated by the control device is transmitted to the camera device via the relay device, the optical-fiber cable, and the optical-transmission card substrate.

9. The remote image-pickup system according to claim 8, wherein the camera-operation control signal comprises at least one selected from the group consisting of:

an image-pickup-condition control signal configured to control the image-pickup condition of the image-pickup unit;

a lens control signal configured to control the operation of a lens included in the image-pickup unit;

a pan control signal configured to control the drive of the image-pickup unit in pan directions; and a tilt control signal configured to control the drive of the image-pickup unit in tilt directions.

10. A remote image-pickup system according to claim 4, wherein an external synchronizing signal is input to the relay device, and the external synchronizing signal is transmitted to the camera device via the optical-fiber cable and the optical-transmission card substrate.

11. The remote image-pickup system according to claim 1, wherein the camera device comprises a card identifying unit for identifying the card substrate inserted into the card slot.

12. A remote image-pickup system according to claim 1, wherein the image-pickup unit comprises a 3-plate CCD.

13. The remote image-pickup system according to claim 1, wherein the image-pickup unit is integrated with a driving unit configured to drive the image-pickup unit in pan and/or tilt directions.

14. A remote image-pickup system according to claim 1, wherein a connector unit including a plurality of input/output terminals and the card slot are disposed in substantially parallel with each other on one side of the camera device.

15. The remote image-pickup system according to claim 1, wherein the means for generating comprises:

a pixel converter configured to convert a digital RGB signal into a video signal of a size compatible with an NTSC or a PAL signal and to input said video signal to a video encoder; and the video encoder configured to output an analog RGB signal, a luminance signal, a chrominance signal, a digital picture signal, a horizontal synchronizing signal, and a vertical synchronizing signal.

16. The remote image-pickup system according to claim 1, wherein the card slot conforms to a compact PCI standard.

17. The remote image-pickup system according to claim 1, wherein the backboard connector is further configured to receive the luminance signal on a first 8-bit bus and the chrominance signal on a second 8-bit bus.

18. The remote image-pickup system according to claim 1, wherein the plurality of card substrates are interchangeable between the card slot included in the camera device and the card slot included in the relay device.

19. A camera device, comprising:

an image-pickup unit configured to capture an image of a subject and to generate video signals;

a generation unit configured to generate a luminance signal and a chrominance signal from said video signals; and a card slot including a backboard connector, the backboard connector configured to receive the luminance signal, the chrominance signal, and a camera operation control signal separately from each other said card slot configured to accommodate insertion of a plurality of card substrates configured to be individually inserted into said card slot and to connect with the backboard connector, each card substrate including a converting unit configured to convert the luminance signal and the chrominance signal to output converted signals having a format compatible with an external device, wherein said camera device is connected to a relay device including another card slot including another backboard connector, the another backboard connector configured to receive the luminance signal, the chrominance signal, and the camera operation control signal separately from each other, said relay device is configured to communicate said converted signals having a format compatible with an external device to a plurality of external devices remote from the image-pickup unit which perform different functions.

20. The camera device according to claim 19, wherein the plurality of card substrates comprise at least one selected from the group consisting of:
an analog card substrate configured to convert the format of the video signals to an analog signal format;
a serial digital interface card substrate configured to convert the format of the video signals to a serial digital interface signal format;
a digital video card substrate configured to convert the format of the video signals to a digital video signal format; and
a network-transmission card substrate configured to convert the format of the video signals to an Internet-protocol signal format.

21. The camera device according to claim 19, wherein the plurality of card substrates comprise an optical-transmission card substrate configured to convert the format of the video signals to a format capable of being transmitted through an optical-fiber cable and to transmit the converted signals.

22. A camera device according to claim 21, wherein, when the optical-transmission card substrate is inserted into the card slot, a camera-operation control signal transmitted from a control device which controls the camera device can be received through the optical-fiber cable.

23. The camera device according to claim 22, wherein the camera-operation control signal comprises at least one selected from the group consisting of:
an image-pickup-condition control signal configured to control the image-pickup condition of the image-pickup unit;
a lens control signal configured to control the operation of a lens included in the image-pickup unit;
a pan control signal configured to control the drive of the image-pickup unit in pan directions; and
a tilt control signal configured to control the drive of the image-pickup unit in tilt directions.

24. The camera device according to claim 21, wherein an external synchronizing signal is received through the optical-fiber cable, when the optical-transmission card substrate is inserted into the card slot.

25. The camera device according to claim 19, further comprising a card identifying unit configured to identify the card substrate inserted into the card slot.

26. A camera device according to claim 19, wherein the image-pickup unit comprises a 3-plate CCD.

27. The camera device according to claim 19, wherein the image-pickup unit is integrated with a driving unit configured to drive the image-pickup unit in pan and/or tilt directions.

28. A camera device according to claim 19, wherein a connector unit including a plurality of input/output terminals and the card slot are disposed in substantially parallel with each other on one side of the camera device.

29. The camera device according to claim 19, wherein the means for generating comprises:

a pixel converter configured to convert a digital RGB signal into a video signal of a size compatible with an NTSC or a PAL signal and to input said video signal to a video encoder; and
the video encoder configured to output an analog RGB signal, a luminance signal, a chrominance signal, a digital picture signal, a horizontal synchronizing signal, and a vertical synchronizing signal.

30. The camera device according to claim 19, wherein the card slot conforms to a compact PCI standard.

31. The camera device according to claim 19, wherein the backboard connector is further configured to receive the luminance signal on a first 8-bit bus and the chrominance signal on a second 8-bit bus.

32. A card substrate configured to be inserted into a card slot provided in a camera device for capturing an image of a subject and generating video signals including a luminance signal and a chrominance signal provided separately from each other to a backboard connector of the camera device,
said card substrate further configured to receive the separately provided luminance signal and the separately provided chrominance signal from the backboard connector of the camera device and to convert the format of the separately provided luminance signal and the separately provided chrominance signal generated by the camera device to output converted signals to an external device,
wherein said camera device is connected to a relay device including another card slot including another backboard connector, the another backboard connector configured to receive the luminance signal, the chrominance signal, and the camera operation control signal separately from each other, and
said relay device is configured to communicate said converted signals having a format compatible with an external device to a plurality of external devices remote from the camera device which perform different functions.

33. The card substrate according to claim 32, comprising at least one selected from the group consisting of:
an analog card substrate configured to convert the format of the video signals to an analog signal format;
a serial digital interface card substrate configured to convert the format of the video signals to a serial digital interface signal format;
a digital video card substrate configured to convert the format of the video signals to a digital video signal format; and
a network-transmission card substrate configured to convert the format of the video signals to an Internet-protocol signal format.

34. The card substrate according to claim 33, wherein the optical-transmission card substrate is configured to multiplex the video signals and to transmit a multiplexed video signal.

35. The card substrate according to claim 34, wherein the optical-transmission card substrate is configured to multiplex the video signals and a synchronizing signal and to transmit a multiplexed signal.

36. The card substrate according to claim 32, comprising an optical-transmission card substrate configured to convert the format of the video signals to a format capable of being transmitted through an optical-fiber cable and to output the converted signals.

37. The card substrate according to claim 32, wherein the optical-transmission card substrate is further configured to receive an 8-bit luminance signal and an 8-bit chrominance signal.

* * * * *